United States Patent
Chui et al.

(10) Patent No.: US 8,402,647 B2
(45) Date of Patent: Mar. 26, 2013

(54) METHODS OF MANUFACTURING ILLUMINATION SYSTEMS

(75) Inventors: Clarence Chui, San Jose, CA (US); Gaurav Sethi, San Jose, CA (US); Jonathan Charles Griffiths, San Jose, CA (US); Manish Kothari, San Jose, CA (US)

(73) Assignee: Qualcomm Mems Technologies Inc., San Diego, CA (US)

( * ) Notice: Subject to any disclaimer, the term of this patent is extended or adjusted under 35 U.S.C. 154(b) by 148 days.

(21) Appl. No.: 12/868,656

(22) Filed: Aug. 25, 2010

(65) Prior Publication Data
US 2012/0047715 A1  Mar. 1, 2012

(51) Int. Cl.
*H05K 3/30* (2006.01)
(52) U.S. Cl. ............... 29/833; 29/428; 29/846; 29/876; 29/469; 361/784; 362/611; 362/616; 349/62; 349/67
(58) Field of Classification Search .................. 29/428, 29/469, 592.1, 602.1, 832, 833, 846, 876; 361/784; 362/616
See application file for complete search history.

(56) References Cited

U.S. PATENT DOCUMENTS

| | | | |
|---|---|---|---|
| 4,282,862 A | 8/1981 | Soleau | |
| 4,375,312 A | 3/1983 | Tangonan | |
| 4,460,940 A | 7/1984 | Mori | |
| 4,471,412 A | 9/1984 | Mori | |
| 4,850,682 A | 7/1989 | Gerritsen | |
| 4,947,291 A | 8/1990 | McDermott | |
| 5,206,747 A | 4/1993 | Wiley et al. | |
| 5,231,532 A | 7/1993 | Magel et al. | |
| 5,291,314 A | 3/1994 | Agranat et al. | |
| 5,311,360 A | 5/1994 | Bloom et al. | |
| 5,422,683 A | 6/1995 | Tanigaki | |
| 5,467,417 A | 11/1995 | Nakamura et al. | |
| 5,506,929 A | 4/1996 | Tai et al. | |
| 5,515,184 A | 5/1996 | Caulfield et al. | |
| 5,544,268 A | 8/1996 | Bischel et al. | |
| 5,555,160 A | 9/1996 | Tawara et al. | |
| 5,592,332 A | 1/1997 | Nishio et al. | |

(Continued)

FOREIGN PATENT DOCUMENTS

| | | |
|---|---|---|
| CN | 2056903 | 5/1990 |
| DE | 3402746 | 8/1985 |

(Continued)

OTHER PUBLICATIONS

Aratani et al. (1994) Surface micromachined tuneable interferometer array. Sensors and Actuators A 43:17-23.

(Continued)

*Primary Examiner* — Paul D Kim
(74) *Attorney, Agent, or Firm* — Knobbe, Martens, Olson & Bear LLP

(57) ABSTRACT

Methods of manufacturing light panels having at least one re-entrant turning feature. In one embodiment, a method of manufacturing a light panel includes providing a base layer, providing a cover layer, and coupling the cover layer to the base layer to form at least one re-entrant turning feature between the base layer and the cover layer. In another embodiment, a method of manufacturing a light panel includes providing a base layer, forming at least one receiving space in the base layer, providing at least one prismatic block, and coupling at least a portion of the prismatic block into the receiving space such that re-entrant turning features are formed between the prismatic block and the base layer.

19 Claims, 9 Drawing Sheets

U.S. PATENT DOCUMENTS

| | | |
|---|---|---|
| 5,594,830 A | 1/1997 | Winston et al. |
| 5,650,865 A | 7/1997 | Smith |
| 5,659,410 A | 8/1997 | Koike et al. |
| 5,671,994 A | 9/1997 | Tai et al. |
| 5,703,667 A | 12/1997 | Ochiai |
| 5,712,694 A | 1/1998 | Taira et al. |
| 5,735,590 A | 4/1998 | Kashima et al. |
| 5,777,589 A | 7/1998 | Gale et al. |
| 5,783,614 A | 7/1998 | Chen et al. |
| 5,808,708 A | 9/1998 | Oyama et al. |
| 5,810,464 A | 9/1998 | Ishikawa et al. |
| 5,854,872 A | 12/1998 | Tai |
| 5,883,684 A | 3/1999 | Millikan et al. |
| 5,913,594 A | 6/1999 | Iimura |
| 5,914,760 A | 6/1999 | Daiku |
| 5,982,540 A | 11/1999 | Koike et al. |
| 6,002,829 A | 12/1999 | Winston et al. |
| 6,014,192 A | 1/2000 | Lehureau et al. |
| 6,021,007 A | 2/2000 | Murtha |
| 6,040,937 A | 3/2000 | Miles |
| 6,048,071 A | 4/2000 | Sawayama |
| 6,094,285 A | 7/2000 | Wickham et al. |
| 6,151,089 A | 11/2000 | Yang et al. |
| 6,158,156 A | 12/2000 | Patrick |
| 6,195,196 B1 | 2/2001 | Kimura et al. |
| 6,196,691 B1 | 3/2001 | Ochiai |
| 6,199,989 B1 | 3/2001 | Maeda et al. |
| 6,211,853 B1 | 4/2001 | Takeuchi et al. |
| 6,259,854 B1 | 7/2001 | Shinji et al. |
| 6,273,577 B1 | 8/2001 | Goto et al. |
| 6,292,504 B1 | 9/2001 | Halmos |
| 6,305,813 B1 | 10/2001 | Lekson et al. |
| 6,369,947 B1 | 4/2002 | Staub et al. |
| 6,379,017 B2 | 4/2002 | Nakabayashi et al. |
| 6,392,368 B1 | 5/2002 | Deller et al. |
| 6,402,325 B1 | 6/2002 | Yamamoto |
| 6,407,785 B1 | 6/2002 | Yamazaki |
| 6,412,969 B1 | 7/2002 | Torihara et al. |
| 6,421,103 B2 | 7/2002 | Yamaguchi |
| 6,512,626 B1 | 1/2003 | Schmidt |
| 6,592,234 B2 | 7/2003 | Epstein et al. |
| 6,598,987 B1 | 7/2003 | Parikka |
| 6,630,968 B1 | 10/2003 | Tsuchihashi et al. |
| 6,642,913 B1 | 11/2003 | Kimura et al. |
| 6,657,683 B2 | 12/2003 | Richard |
| 6,667,782 B1 | 12/2003 | Taira et al. |
| 6,669,350 B2 | 12/2003 | Yamashita et al. |
| 6,674,562 B1 | 1/2004 | Miles |
| 6,685,342 B2 | 2/2004 | Terada |
| 6,706,339 B1 | 3/2004 | Miyatake et al. |
| 6,747,785 B2 | 6/2004 | Chen et al. |
| 6,747,801 B2 | 6/2004 | Umemoto et al. |
| 6,773,126 B1 | 8/2004 | Hatjasalo et al. |
| 6,778,746 B2 | 8/2004 | Charlton et al. |
| 6,829,258 B1 | 12/2004 | Carlisle et al. |
| 6,865,312 B2 | 3/2005 | Niv et al. |
| 6,871,982 B2 | 3/2005 | Holman et al. |
| 6,879,354 B1 | 4/2005 | Sawayama et al. |
| 6,883,924 B2 | 4/2005 | Maeda et al. |
| 6,891,530 B2 | 5/2005 | Umemoto et al. |
| 6,891,658 B2 | 5/2005 | Whitehead et al. |
| 6,951,401 B2 | 10/2005 | Van Hees et al. |
| 6,967,779 B2 | 11/2005 | Fadel et al. |
| 6,972,753 B1 | 12/2005 | Kimura et al. |
| 6,998,196 B2 | 2/2006 | Rich et al. |
| 7,010,212 B2 | 3/2006 | Emmons et al. |
| 7,014,349 B2 | 3/2006 | Shinohara et al. |
| 7,018,088 B2 | 3/2006 | Yu et al. |
| 7,041,344 B2 | 5/2006 | Kusume et al. |
| 7,042,643 B2 | 5/2006 | Miles |
| 7,072,096 B2 | 7/2006 | Holman et al. |
| 7,110,158 B2 | 9/2006 | Miles |
| 7,123,216 B1 | 10/2006 | Miles |
| 7,133,022 B2 | 11/2006 | Grabert |
| 7,186,014 B2 | 3/2007 | Shimura |
| 7,210,806 B2 | 5/2007 | Holman et al. |
| 7,218,812 B2 | 5/2007 | Maxwell et al. |
| 7,223,010 B2 | 5/2007 | Min et al. |
| 7,234,854 B2 | 6/2007 | Masamoto |
| 7,262,754 B1 | 8/2007 | Yamazaki |
| 7,262,916 B2 | 8/2007 | Kao et al. |
| 7,278,774 B2 | 10/2007 | Chang |
| 7,327,510 B2 | 2/2008 | Cummings et al. |
| 7,352,501 B2 | 4/2008 | Chopra et al. |
| 7,360,899 B2 | 4/2008 | McGuire et al. |
| 7,360,939 B2 | 4/2008 | Sugiura |
| 7,376,308 B2 | 5/2008 | Cheben et al. |
| 7,380,970 B2 | 6/2008 | Hwang et al. |
| 7,400,439 B2 | 7/2008 | Holman et al. |
| 7,417,784 B2 | 8/2008 | Sasagawa et al. |
| 7,450,295 B2 | 11/2008 | Tung et al. |
| 7,452,120 B2 | 11/2008 | Lee et al. |
| 7,520,642 B2 | 4/2009 | Holman et al. |
| 7,573,631 B1 | 8/2009 | Amm |
| 7,656,391 B2 | 2/2010 | Kimura et al. |
| 7,663,714 B2 | 2/2010 | Haga et al. |
| 7,706,050 B2 | 4/2010 | Sampsell |
| 7,733,439 B2 | 6/2010 | Sampsell et al. |
| 7,766,531 B2 | 8/2010 | Anderson et al. |
| 7,864,395 B2 | 1/2011 | Chui |
| 2001/0019479 A1 | 9/2001 | Nakabayashi et al. |
| 2001/0022636 A1 | 9/2001 | Yang et al. |
| 2001/0030861 A1 | 10/2001 | Oda et al. |
| 2001/0055076 A1 | 12/2001 | Ochi et al. |
| 2001/0055208 A1 | 12/2001 | Kimura |
| 2002/0044445 A1 | 4/2002 | Bohler et al. |
| 2002/0048444 A1 | 4/2002 | Sung et al. |
| 2002/0054258 A1 | 5/2002 | Kondo et al. |
| 2002/0054424 A1 | 5/2002 | Miles |
| 2002/0106182 A1 | 8/2002 | Kawashima |
| 2002/0113241 A1 | 8/2002 | Kubota et al. |
| 2002/0172039 A1 | 11/2002 | Inditsky |
| 2002/0180910 A1 | 12/2002 | Umemoto et al. |
| 2003/0016930 A1 | 1/2003 | Inditsky |
| 2003/0026536 A1 | 2/2003 | Ho |
| 2003/0030764 A1 | 2/2003 | Lee |
| 2003/0034445 A1 | 2/2003 | Boyd et al. |
| 2003/0067760 A1 | 4/2003 | Jagt et al. |
| 2003/0071947 A1 | 4/2003 | Shiraogawa et al. |
| 2003/0083429 A1 | 5/2003 | Smith et al. |
| 2003/0086030 A1 | 5/2003 | Taniguchi et al. |
| 2003/0086031 A1 | 5/2003 | Taniguchi et al. |
| 2003/0090887 A1 | 5/2003 | Igarashi et al. |
| 2003/0095401 A1 | 5/2003 | Hanson et al. |
| 2003/0103344 A1 | 6/2003 | Niida et al. |
| 2003/0123245 A1 | 7/2003 | Parker |
| 2003/0128538 A1 | 7/2003 | Shinohara et al. |
| 2003/0160919 A1 | 8/2003 | Suzuki et al. |
| 2003/0165067 A1 | 9/2003 | Imamura et al. |
| 2003/0169385 A1 | 9/2003 | Okuwaki |
| 2003/0184989 A1 | 10/2003 | Matsumoto et al. |
| 2003/0210222 A1 | 11/2003 | Ogiwara et al. |
| 2003/0210367 A1 | 11/2003 | Nakano et al. |
| 2004/0001169 A1 | 1/2004 | Saiki et al. |
| 2004/0032659 A1 | 2/2004 | Drinkwater |
| 2004/0080807 A1 | 4/2004 | Chen et al. |
| 2004/0090765 A1 | 5/2004 | Yu et al. |
| 2004/0135494 A1 | 7/2004 | Miyatake |
| 2004/0145811 A1 | 7/2004 | Lin et al. |
| 2004/0170373 A1 | 9/2004 | Kim |
| 2004/0207995 A1 | 10/2004 | Park et al. |
| 2004/0228109 A1 | 11/2004 | Leu et al. |
| 2004/0228112 A1 | 11/2004 | Takata |
| 2004/0246743 A1 | 12/2004 | Lee et al. |
| 2005/0002175 A1 | 1/2005 | Matsui et al. |
| 2005/0024890 A1 | 2/2005 | Yamamoto et al. |
| 2005/0046011 A1 | 3/2005 | Chen et al. |
| 2005/0069254 A1 | 3/2005 | Schultheis et al. |
| 2005/0088719 A1 | 4/2005 | Patel et al. |
| 2005/0116924 A1 | 6/2005 | Sauvante et al. |
| 2005/0117190 A1 | 6/2005 | Iwauchi et al. |
| 2005/0133761 A1 | 6/2005 | Thielemans |
| 2005/0141065 A1 | 6/2005 | Masamoto |
| 2005/0179977 A1 | 8/2005 | Chui et al. |
| 2005/0185416 A1 | 8/2005 | Lee et al. |
| 2005/0231981 A1 | 10/2005 | Hoelen et al. |
| 2005/0259302 A9 | 11/2005 | Metz et al. |

| | | | | | | |
|---|---|---|---|---|---|---|
| 2005/0259939 | A1 | 11/2005 | Rinko | EP | 1 122 586 | 8/2001 |
| 2005/0270798 | A1 | 12/2005 | Lee et al. | EP | 1 251 454 | 4/2002 |
| 2005/0271325 | A1 | 12/2005 | Anderson et al. | EP | 1 271 223 | 6/2002 |
| 2006/0002141 | A1 | 1/2006 | Ouderkirk et al. | EP | 1 279 892 | 1/2003 |
| 2006/0002675 | A1 | 1/2006 | Choi et al. | EP | 1 329 664 | 7/2003 |
| 2006/0024017 | A1 | 2/2006 | Page et al. | EP | 1 336 876 | 8/2003 |
| 2006/0044523 | A1 | 3/2006 | Teijido et al. | EP | 1 347 315 | 9/2003 |
| 2006/0061705 | A1 | 3/2006 | Onishi | EP | 1 389 775 | 2/2004 |
| 2006/0066783 | A1 | 3/2006 | Sampsell | EP | 1 413 543 | 4/2004 |
| 2006/0067651 | A1 | 3/2006 | Chui | EP | 1 437 610 | 7/2004 |
| 2006/0077617 | A1 | 4/2006 | Floyd | EP | 1 544 537 | 6/2005 |
| 2006/0110090 | A1 | 5/2006 | Ellwood | EP | 1 577 701 | 9/2005 |
| 2006/0132383 | A1 | 6/2006 | Gally et al. | EP | 1 698 918 | 9/2006 |
| 2006/0181903 | A1 | 8/2006 | Okuwaki | EP | 1 734 401 | 12/2006 |
| 2006/0187676 | A1 | 8/2006 | Ishikura | EP | 1 762 778 | 3/2007 |
| 2006/0215958 | A1 | 9/2006 | Yeo et al. | EP | 1 928 028 | 6/2008 |
| 2006/0262562 | A1 | 11/2006 | Fukasawa et al. | EP | 1 975 651 | 10/2008 |
| 2006/0265919 | A1 | 11/2006 | Huang | FR | 2 824 643 | 5/2001 |
| 2006/0268574 | A1 | 11/2006 | Jung et al. | GB | 2 260 203 | 4/1993 |
| 2006/0274243 | A1 | 12/2006 | Iijima et al. | GB | 2321532 | 7/1998 |
| 2006/0279558 | A1 | 12/2006 | Van Delden et al. | GB | 2 331 615 | 5/1999 |
| 2007/0001187 | A1 | 1/2007 | Kim | GB | 2 336 933 | 11/1999 |
| 2007/0116424 | A1 | 5/2007 | Ting et al. | GB | 2 351 834 | 1/2001 |
| 2007/0133226 | A1 | 6/2007 | Mi | JP | 60-242408 | 12/1985 |
| 2007/0147087 | A1 | 6/2007 | Parker et al. | JP | 07-199829 | 8/1995 |
| 2007/0187852 | A1 | 8/2007 | Parker et al. | JP | 09-022012 | 1/1997 |
| 2007/0189036 | A1 | 8/2007 | Chen et al. | JP | 09-171111 | 6/1997 |
| 2007/0247872 | A1 | 10/2007 | Lee et al. | JP | 09-281917 | 10/1997 |
| 2007/0279727 | A1 | 12/2007 | Gandhi et al. | JP | 09-311333 | 12/1997 |
| 2007/0292091 | A1 | 12/2007 | Fujii et al. | JP | 11-52887 | 2/1999 |
| 2008/0018617 | A1 | 1/2008 | Ng et al. | JP | 11-211999 | 8/1999 |
| 2008/0079870 | A1 | 4/2008 | Kazuhiro et al. | JP | 11-224524 | 8/1999 |
| 2008/0089092 | A1 | 4/2008 | Lee et al. | JP | 11-227248 | 8/1999 |
| 2008/0090025 | A1 | 4/2008 | Freking | JP | 11-232919 | 8/1999 |
| 2008/0094853 | A1 | 4/2008 | Kim et al. | JP | 11-326898 | 11/1999 |
| 2008/0232135 | A1 | 9/2008 | Kinder et al. | JP | 2000-075293 | 3/2000 |
| 2008/0278460 | A1 | 11/2008 | Arnett et al. | JP | 2000-193933 | 11/2000 |
| 2008/0278663 | A1 | 11/2008 | Krishnan et al. | JP | 2000-314882 | 11/2000 |
| 2008/0285307 | A1 | 11/2008 | Aylward et al. | JP | 2001-243822 | 9/2001 |
| 2009/0015753 | A1 | 1/2009 | Ye | JP | 2001-297615 | 10/2001 |
| 2009/0086466 | A1 | 4/2009 | Sugita et al. | JP | 2001-320092 | 11/2001 |
| 2009/0096956 | A1 | 4/2009 | Uehara et al. | JP | 2002-090549 | 3/2002 |
| 2009/0126777 | A1 | 5/2009 | Khazeni et al. | JP | 2002-108227 | 4/2002 |
| 2009/0135469 | A1 | 5/2009 | Lee et al. | JP | 2002-163907 | 6/2002 |
| 2009/0147332 | A1 | 6/2009 | Bita et al. | JP | 2002-174732 | 6/2002 |
| 2009/0168459 | A1 | 7/2009 | Holman et al. | JP | 2002-174780 | 6/2002 |
| 2009/0244690 | A1 | 10/2009 | Lee | JP | 2002-245835 | 12/2002 |
| 2009/0296193 | A1 | 12/2009 | Bita et al. | JP | 2003-045052 | 2/2003 |
| 2010/0039832 | A1 | 2/2010 | Ahlgren et al. | JP | 2003-057652 | 2/2003 |
| 2010/0051089 | A1 | 3/2010 | Khazeni et al. | JP | 2003-057653 | 2/2003 |
| 2010/0053148 | A1 | 3/2010 | Khazeni et al. | JP | 2003-066451 | 3/2003 |
| 2010/0096718 | A1 | 4/2010 | Hynecek et al. | JP | 2003-140118 | 5/2003 |
| 2010/0118563 | A1 | 5/2010 | Shen et al. | JP | 2003-149642 | 5/2003 |
| 2010/0142226 | A1 | 6/2010 | Vogt et al. | JP | 2004-149643 | 5/2003 |
| 2010/0157624 | A1 | 6/2010 | Liao et al. | JP | 2003-173713 | 6/2003 |
| 2010/0177533 | A1 | 7/2010 | Griffiths et al. | JP | 2003-344881 | 12/2003 |
| 2010/0187422 | A1 | 7/2010 | Kothari et al. | JP | 2004-012918 | 1/2004 |
| 2010/0231510 | A1 | 9/2010 | Sampsell et al. | JP | 2004-062099 | 2/2004 |
| 2010/0238529 | A1 | 9/2010 | Sampsell et al. | JP | 2004-087409 | 3/2004 |
| 2010/0302616 | A1 | 12/2010 | Bita et al. | JP | 2004-186024 | 7/2004 |
| 2010/0302802 | A1 | 12/2010 | Bita et al. | JP | 2004-212673 | 7/2004 |
| 2010/0302803 | A1 | 12/2010 | Bita et al. | JP | 2005-259365 | 9/2005 |
| 2010/0309687 | A1 | 12/2010 | Sampsell et al. | JP | 2005-316178 | 11/2005 |
| 2011/0122479 | A1 | 5/2011 | Sampsell | JP | 2006 107993 | 4/2006 |
| 2011/0175533 | A1 | 7/2011 | Holman et al. | JP | 2008-103110 | 5/2008 |
| 2011/0175553 | A1 | 7/2011 | Sampsell | KR | 10-0754400 | 8/2007 |
| 2011/0226332 | A1 | 9/2011 | Ford et al. | KR | 10-2008-0088683 | 10/2008 |
| | | | | TW | 567388 | 12/2003 |
| | | FOREIGN PATENT DOCUMENTS | | WO | WO 95/01584 | 1/1995 |
| DE | | 199 42 513 | 3/2001 | WO | WO 95/14256 | 5/1995 |
| EP | | 0 278 038 | 8/1988 | WO | WO 98/19201 | 5/1998 |
| EP | | 0 362 993 | 4/1990 | WO | WO 98/32047 | 7/1998 |
| EP | | 0 539 099 | 4/1993 | WO | WO 99/63394 | 12/1999 |
| EP | | 0 590 511 | 4/1994 | WO | WO 99/64785 | 12/1999 |
| EP | | 0 621 500 | 10/1994 | WO | WO 01/06816 | 1/2001 |
| EP | | 0 879 991 | 11/1998 | WO | WO 01/29148 | 4/2001 |
| EP | | 0 907 050 | 4/1999 | WO | WO 01/57434 | 8/2001 |
| EP | | 1 003 062 | 5/2000 | WO | WO 01/59362 | 8/2001 |
| EP | | 1 116 987 | 7/2001 | WO | WO 01/84228 | 11/2001 |

| | | |
|---|---|---|
| WO | WO 01/84229 | 11/2001 |
| WO | WO 02/06858 | 1/2002 |
| WO | WO 02/25359 | 3/2002 |
| WO | WO 02/097324 | 12/2002 |
| WO | WO 03/032058 | 4/2003 |
| WO | WO 03/038509 | 5/2003 |
| WO | WO 03/056876 | 7/2003 |
| WO | WO 03/062912 | 7/2003 |
| WO | WO 2004/088372 | 10/2004 |
| WO | WO 2004/114418 | 12/2004 |
| WO | WO 2005/011012 | 2/2005 |
| WO | WO 2005/073622 | 8/2005 |
| WO | WO 2005/088367 | 9/2005 |
| WO | WO 2006/035698 | 4/2006 |
| WO | WO 2007/064133 | 6/2007 |
| WO | WO 2008/045207 | 9/2007 |
| WO | WO 2008/038754 | 4/2008 |
| WO | WO 2008/045200 | 4/2008 |
| WO | WO 2008/045224 | 4/2008 |
| WO | WO 2008/062363 | 5/2008 |
| WO | WO 2008/122915 | 10/2008 |
| WO | WO 2009/011922 | 1/2009 |

OTHER PUBLICATIONS

Handbook of Optics sponsored by the Optical Society of America: Michael Bass, editor in chief. $2^{nd}$ Ed. 1995.
Zhou et al. (1998) Waveguide panel display using electromechanical spatial modulators. SID International Symposium. Digest of Technical Papers. vol. 29:1022-1025.
ISR and WO dated Dec. 30, 2009 in PCT/US09/055527.
IPRP dated Jul. 27, 2010 in PCT/US09/055527.
Invitation to Pay Additional Fees dated Oct. 1, 2009 in PCT/US09/046941.
ISR and WO dated Jan. 14, 2010 in PCT/US09/046941.
ip.com PriorArtDatabase, May 15, 2006, Spreaders in light-guide optics, disclosed anonymously, IPCOM000136314D, 3 pp.
Feng et al., Novel integrated light-guide plates for liquid crystal display backlight, Journal of Optics A: Pure and Applied Optics, 7:111-117.
ISR and WO dated Feb. 7, 2012 in PCT/US11/048689.
Written Opinion dated Aug. 9, 2012 in PCT/US11/048689.
IPRP dated Oct. 15, 2012 in PCT/US11/048689.

METHODS OF MANUFACTURING ILLUMINATION SYSTEMS

BACKGROUND

1. Field of the Invention

The invention relates to the field of lighting, and in particular, light extraction in illumination systems.

2. Description of the Related Art

A variety of architectural lighting configurations are utilized to provide artificial illumination in a wide variety of indoor and/or outdoor locations. Such illumination systems can include fixed and portable architectural lighting. Various configurations can employ technologies such as incandescent, fluorescent, and/or light emitting diode based light sources.

One type of architectural lighting configuration can be referred to generally as panel lighting. Panel lights may include, for example, fluorescent lighting in a light box behind a plastic lenticular panel. Panel lighting is often configured as planar and square or rectangular and having width and length dimensions significantly greater than a thickness dimension. While the thickness of panel lighting is generally significantly less than corresponding width and length dimensions, it is frequently the case that the thickness of existing panel lighting forces limitations in installation and use. Display front and backlight techniques can be applied to large area (such as 4'×8') flat panel lighting.

One specific type of panel lighting is flat panel lighting. Flat panel lights are commonly found in flat panel display applications, which include a transparent panel designed to provide illumination from its planar surface. Light is provided into the panel from a light source (e.g., LEDs or a CCFL lamp), which may be positioned along one or more edges of the panel. Light travels throughout the panel, staying within the panel due to total internal reflection at its front planar surface and back planar surface. At some places on the panel, light may be directed out of the panel by a light extraction or turning feature.

Flat light panels can be sized for luminaire or architectural applications. For architectural applications a panel may be about 4'×8', or made of tiles of smaller dimensions. Some embodiments include two or more flat light panels adjacently disposed. Thus, flat panel lights can be applied to large areas. Flat panel lights can be used as a luminaire or as a partially transparent light panel and screen. For example, a flat panel light may be used as a privacy screen. The panel can be glass, polymer such as acrylic, polyethylene terephthalate, polycarbonate etc. A 4'×8' panel may require a thickness of about 0.25" or greater to allow adequate transmission of light along its width, when illuminated from two edges.

In existing panel designs, light extraction features are often grooves or other features cut into the surface of the panel. However, these machined or embossed features are can be inefficient.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments," one will understand how the features of this invention provide advantages over other lighting devices.

Certain embodiments of the invention include methods of manufacturing a light panel having re-entrant turning features formed therein. According to one embodiment a method of manufacturing a light panel includes providing a base layer having an upper surface, a lower surface opposite the upper surface, a first end configured to receive light from a light source, and a second end opposite the first end, the upper surface including a first plurality of planar portions and a plurality of receiving spaces disposed between the first plurality of planar portions, wherein the plurality of receiving spaces are disposed at least partially between the first plurality of planar portions and the lower surface. The method further includes providing a cover layer having a first surface and a second surface opposite the first surface, the second surface including a second plurality of planar portions and a plurality of protrusions extending from the cover layer away from the first surface, wherein the second plurality of planar portions are disposed at least partially between the plurality of protrusions and the first surface, and coupling the cover layer to the base layer such that at least one of the first plurality of planar portions is positioned over at least one of the second plurality of planar portions and such that at least one of the plurality of receiving spaces receives at least one of the plurality of protrusions to form at least one re-entrant turning feature between the base layer and the cover layer.

In another aspect, each of the first plurality of planar portions share a common plane and/or each of the second plurality of planar portions share a common plane. In another aspect, the base later has an index of refraction characteristic, the cover layer has an index of refraction characteristic, and the index of refraction characteristic of the base layer is greater than the index of refraction characteristic of the base layer. In one aspect, an adhesive is used to couple the base layer to the cover layer and the adhesive layer has an index of refraction characteristic that is closer to the index of refraction characteristic of the cover layer than the index of refraction characteristic of the base layer. In another aspect, the upper surface of the base layer is bonded to the second surface of the cover layer. In one aspect, the index of refraction characteristic of the adhesive is about the same as the index of refraction characteristic of the cover layer.

In yet another aspect, the at least one re-entrant turning feature extends between the lower surface of the base layer and the first surface of the cover layer at an angle relative to the plane shared by the plurality of first planar portions. In one aspect, coupling the cover layer to the base layer forms a first re-entrant turning feature and a second re-entrant turning feature between the base layer and the cover layer, the first re-entrant turning feature extends between the lower surface of the base layer and the first surface of the cover layer at a first angle relative to the plane shared by the first plurality of planar portions, the second re-entrant turning feature extends between the lower surface of the base layer and the first surface of the cover layer at a second angle relative to the plane shared by the first plurality of planar portions, and the first angle is different from the second angle. In another aspect, the at least one of the plurality protrusions includes a trapezoidal prism having first and second sidewalls, the first sidewall is disposed between the second sidewall and the first end at a first angle relative to the lower surface, and the second sidewall is disposed at a second angle relative to the lower surface. In one aspect, at least one of the receiving spaces includes a trapezoidal trough having third and fourth sidewalls, the third sidewall is disposed at a third angle relative to the lower surface, and the fourth sidewall is disposed at a fourth angle relative to the lower surface. In another aspect, the third sidewall is disposed adjacent to at least a portion of the first sidewall, and the fourth sidewall is disposed adjacent to at least a portion of the second sidewall. In one aspect, the first angle is different from the third angle and the second angle is different from the fourth angle. In another aspect, the first sidewall and the third sidewall define a re-entrant turning feature therebetween and the second sidewall and the fourth sidewall define a re-entrant turning feature therebetween.

According to another embodiment, a method of manufacturing a light panel includes providing a base layer having an upper surface, a lower surface opposite the upper surface, forming at least one receiving space in the upper surface, the at least one receiving space extending from the upper surface toward the lower surface, wherein the at least one receiving space has a first sidewall and a second sidewall, wherein the first sidewall forms a first angle with the lower surface, and wherein the second sidewall forms a second angle with the lower surface, providing at least one prismatic block, wherein the at least one prismatic block has a third sidewall, a fourth sidewall, and a first planar surface disposed therebetween, wherein the third sidewall forms a third angle with the first planar surface, and wherein the fourth sidewall forms a fourth angle with the first planar surface, and coupling at least a portion of the at least one prismatic block into the at least one receiving space such that at least a portion of the third sidewall is disposed adjacent to at least a portion of the first sidewall and such that at least a portion of the second sidewall is disposed adjacent to at least a portion of the fourth sidewall such that the first and third sidewalls form a first re-entrant turning feature therebetween, and the second and fourth sidewalls form a second re-entrant turning feature therebetween.

In one aspect, the base layer includes a first end for receiving light from a light source and a second end opposite the first end, and the first and second re-entrant turning features are configured to turn at least a portion of light received through the first end toward the lower surface of the base layer. In another aspect, the at least one prismatic block includes a trapezoidal prism and the at least one receiving space includes a trapezoidal trough. In another aspect, the first angle is different than the second angle and the first angle is different than the first angle. In another aspect, the second angle is different than the fourth angle. In yet another aspect, the base layer has an index of refraction characteristic, the at least one prismatic block has an index of refraction characteristic, and the index of refraction characteristic of the at least one prismatic block is about the same as the index of refraction characteristic of the base layer. In one aspect, the method further includes coupling the at least one prismatic block to the base layer. In another aspect, an adhesive is used to couple the at least one prismatic block to the base layer, wherein the adhesive has an index of refraction characteristic that is about the same as the index of refraction characteristic of the base layer.

According to another embodiment, a method of manufacturing a light panel includes providing a layer having an upper surface, a lower surface opposite the upper surface, a first end configured to receive light from a light source, and a second end opposite the first end, providing a first prismatic block, the first prismatic block having a first sidewall, a second sidewall, and a first planar surface disposed therebetween, wherein the first sidewall forms a first angle with the first planar surface, and wherein the second sidewall forms a second angle with the first planar surface, disposing the first prismatic block on the base layer, providing a second prismatic block, the second prismatic block having a third sidewall, a fourth sidewall, and a second planar surface disposed therebetween, wherein the third sidewall forms a third angle with the second planar surface, and wherein the fourth sidewall forms a fourth angle with the second planar surface, disposing the second prismatic block on the base layer such that the first prismatic block and the second prismatic block form a receiving space therebetween, wherein the receiving space is disposed between the second sidewall and the third sidewall, providing a third prismatic block, the third prismatic block having a fifth sidewall, a sixth sidewall, and a third planar surface disposed therebetween, wherein the fifth sidewall forms a firth angle with the third planar surface, and wherein the sixth sidewall form a sixth angle with the third planar surface, and disposing at least a portion of the third prismatic block in the receiving space such that at least a portion of the fifth sidewall is disposed adjacent to at least a portion of the second sidewall and such that at least a portion of the sixth sidewall is disposed adjacent to at least a portion of the third sidewall, wherein the second and fifth sidewalls form a first re-entrant turning feature therebetween, wherein the third and sixth sidewalls from a second re-entrant turning feature therebetween.

In one aspect, the first re-entrant turning feature extends along a first longitudinal axis that forms a first angle with the upper surface and the second re-entrant turning feature extends along a second longitudinal axis that forms a second angle with the upper surface. In another aspect, the first angle is different from the second angle. In one aspect, the method further includes coupling the first prismatic block to the base layer, coupling the second prismatic block to the base layer, and coupling the third prismatic block to the base layer.

DETAILED DESCRIPTION OF PREFERRED EMBODIMENTS

Figure 1:
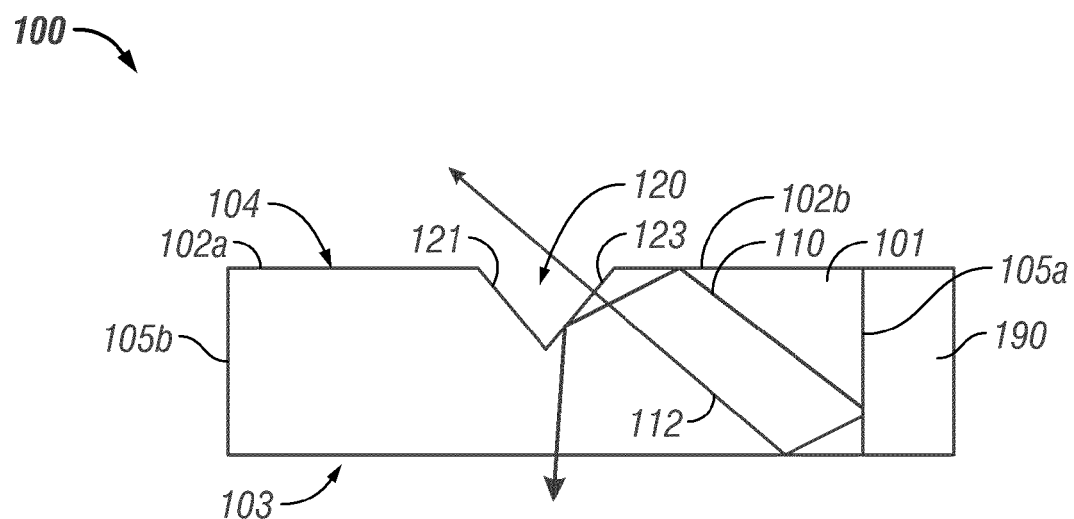
FIG. 1 is cross-section of an illumination system schematically illustrating one embodiment of a light turning feature.

The following detailed description is directed to certain specific embodiments of the invention. However, the invention can be embodied in a multitude of different ways. For example, methods of manufacturing turning features can be used in manufacturing architectural light panels and also in manufacturing front light systems for display devices. It will be appreciated that the illustrated systems are not necessarily drawn to scale and their relative sizes can differ. Moreover, the relative angles of the edges of the turning features can differ from those illustrated. Furthermore, the cross-sectional areas of the turning features can vary and the relative orientations and angles defined by the edges of the turning features can vary from turning feature to turning feature. In this description, reference is made to the drawings wherein like parts are designated with like numerals throughout.

Illumination systems may include numerous light turning or extraction features that are cut or embossed into at least one planar surface of the system (e.g., a planar surface of a light panel). The light turning features may include, for example, grooves, pits, dots, or prismatic features, which are formed as part of the system. In some embodiments, illumination systems include v-shaped grooves that are configured to turn (for example, reflect) light propagating within a light panel, that is incident on an edge of the groove, toward a particular direction (e.g., toward a surface of the light panel so that the light exits the surface). However, light that is propagating within a light panel and incident on an edge of the v-shaped groove at an angle above the critical angle can propagate through the groove and can be considered "lost" light as it is not turned toward the desired particular direction (e.g., and therefore does not exit a surface of the light panel).

The loss of light through turning features in an illumination system can be reduced or mitigated by incorporating re-entrant turning features into the illumination system. As used herein, a "re-entrant turning feature" refers to a turning feature in an illumination system configured to re-inject light that propagates through the turning feature back into a light panel. In some embodiments, re-entrant turning features comprise "slit-shaped" turning features. Slit-shaped turning features may comprise gaps, slits, volumes, or spaces within at least a portion of a light panel that extend at an angle relative to the top and/or bottom surfaces of the panel. Such turning features can reduce light loss by recycling light that propagates through a turning feature and redirecting or re-injecting this light back into the light guide. Re-entrant turning features can be formed monolithically using traditional molding processes (e.g., injection molding) or by computer controlled machining. However, these processes can limit flexibility in design. For example, these methods limit how close the leading and trailing edges of a turning feature can be fabricated relative to each other. Methods disclosed herein incorporate composition approaches to re-entrant turning feature fabrication that allow for increased efficiency (e.g., reduction of light loss) and flexibility in illumination system design.

FIG. 1 is a cross-section of an illumination system 100 including a light panel 101 having a v-shaped turning feature 120. A light source 190 is positioned adjacent to a first edge 105a of the light panel 101 and a second edge 105b is disposed opposite to the first edge 105a. The light panel 101 also includes a generally planar upper surface 104 and a generally planar lower surface 103 disposed opposite to the upper surface. For clarity of description, the embodiments disclosed herein will generally be described in relation to an upper surface and a lower surface (e.g., as referenced by the relative positions of the illustrated surfaces with respect to page orientation). However, one having ordinary skill in the art will appreciate that the systems can be oriented in any direction during use, including flipped from top-to-bottom and/or side-to-side; accordingly, every embodiment and example described herein with reference to the upper surface can also be implemented on the back surface and vice-versa.

In some embodiments, the upper surface 104 and the lower surface 103 of the light panel 101 may have approximately the same surface area. However, it is possible they could be different in size and/or shape, for example, in embodiments where the first edge 105a and/or the second edge 105b are slanted (e.g., not perpendicular to the upper and lower surfaces 104, 103). In some embodiments, the upper surface 104 and the lower surface 103 can each be about 4'×8' and they can be generally vertically aligned with one another. The light panel 101 can comprise various optically transmissive materials, for example, glass, polymer, polycarbonate, polyethylene terephthalate, glycol-modified polyethylene terephthalate, amorphous thermoplastic, and/or other substrates.

The light source 190 can be configured to inject light into the light panel 101 at least through the first edge 105a. The light source 190 may comprise one or more light emitting diodes, fluorescent lights, light bars, or any other suitable light source(s). In some embodiments, the system 100 can include more than one light source 190, for example, a second light source 190 can be disposed adjacent to the second edge 105b. Injected rays of light 110, 112 may propagate from the light source 190 into the panel 101. Light propagating through the panel 101 can be trapped within the panel 101 by total internal reflection ("TIR") until it encounters a light turning feature 120 that is configured to turn light so that the light propagates toward the lower surface 103 of the light panel 101. Light turning feature 120 includes a first edge 121 and a second edge 123 that define a v-shaped groove or trough in the upper surface 104 of the light panel 101 that extends toward the lower surface 103. The upper surface 104 includes a first planar portion 102a and a second planar portion 102b disposed on opposite sides of the light turning feature 120. When light propagating within the light panel 101 encounters the first edge 121 and/or second edge 123 of the light turning feature 120, some of the light may be extracted from the panel and turned toward the lower side 103 making the panel 101 appear bright to a viewer from that side. For example, ray of light 110 can be injected into the light panel 101 by the light source 190 and turned toward the lower surface 103 by the second edge 123 of the light turning feature 120.

V-shaped turning features similar to turning feature 120 schematically illustrated in FIG. 1 are susceptible to light loss, which can reduce the overall proportion of light that is ultimately turned out of the light panel 101 to light that is injected into the light panel 101 by the light source 190. In one embodiment, light incident on turning feature 120 at an angle close to the critical angle (e.g., the angle of incidence above which total reflection occurs for a given medium boundary) is not reflected by the turning feature 120 and can propagate through the turning feature and out of the panel 101. Light that passes through the turning feature and out of the panel 101 can be considered lost because it is not reflected toward one or more desired directions. In illumination systems, lost light can reduce the brightness and/or uniformity of a display. For example, ray of light 112 in FIG. 1 encounters the turning feature 120 at an angle of incident that is close to 90° and propagates through the turning feature 120 instead of being redirected or turned. Thus, ray of light 112 can be considered lost because it is not extracted through the lower surface 103.

Figure 2:
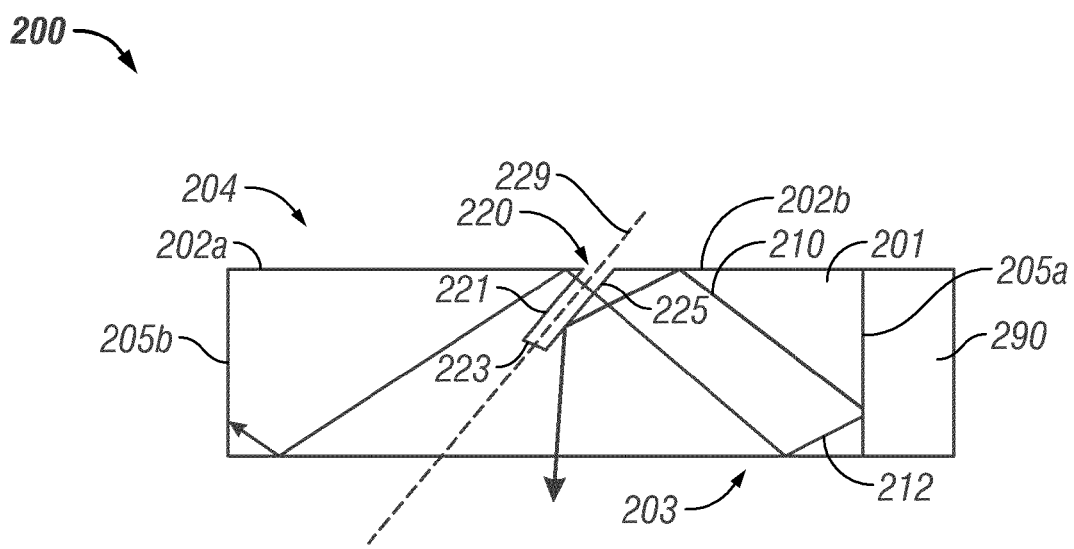
FIG. 2 is a cross-section of an illumination system schematically illustrating an embodiment of a re-entrant turning feature.

Turning now to FIG. 2, an embodiment of an illumination system 200 is schematically illustrated including a light panel 201 and a light source 290 disposed near the light panel 101. The light panel 201 includes a re-entrant turning feature 220 that comprises a slit formed in the upper surface 204 of the light panel 201. The turning feature 220 extends along a longitudinal axis 229 from the upper surface toward the lower surface at an angle relative to the upper surface. The turning feature 220 includes a first edge 221, a second edge 225 opposite to the first edge, and a base edge 223 disposed between the first edge and the second edge. In some embodiments, the first edge 221 and the second edge 225 can extend generally parallel to one another and in other embodiments, the first edge 221 can extend at an angle relative to the second edge 225 and vice-versa. The turning feature 220 can thus define a volume having the shape of a parallelogram. To allow for the re-injection (or recycling) of light that passes through the turning feature 220, the second edge 225 is positioned such that it is disposed between a portion of the light panel 201 and the first edge 221. Additionally, the first edge 221 is positioned such that it is disposed between at least a portion of the light panel 201 and at least a portion of the second edge 225. Thus, the light turning feature 220 is oriented within the light panel 201 such that at least a portion of the light panel 201 is disposed on opposite sides of the longitudinal axis 229 of the turning feature.

The slit-shaped re-entrant turning feature 220 can reduce lost light and improve the efficiency of the system 200 by recycling light that propagates through the turning feature 220. For example, ray of light 210 injected into the panel 201 through the first edge 205a by the light source 290 generally propagates toward the second edge 205b. The ray 210 encounters the second edge 225 of the turning feature 220 at an angle above the critical angle and is turned by TIR toward the lower surface 203 of the panel 201. In some embodiments, light turned by the turning feature 220 can encounter the lower surface 203 at an angle below the critical angle and propagate out of the light panel. In other embodiments, light turned by the turning feature 220 can encounter the lower surface 203 at an angle above the critical angle and continue to be bound within the light panel by TIR. In another example, ray of light 212 is injected into the panel 201 by the light source 290 and encounters the second edge 225 of turning feature 220 at an angle of incidence that is below the critical angle. Because ray of light 212 encounters the turning feature 220 at an angle below the critical angle, the ray 212 is not bound by TIR and propagates through the turning feature 220. However, because of the shape and orientation of the turning feature 220, after propagating through the turning feature, ray 212 is re-injected into the panel 201 and the ray can be considered to be recycled. The re-injection or recycling of ray 212 can increase the brightness and efficiency of the illumination system 200 as ray of light 212 can continue to propagate within the panel 201 until it is turned toward the lower surface by turning feature 220 instead of being lost.

As discussed above, re-entrant turning features, for example, turning feature 220 in FIG. 2, can be formed monolithically using various methods. Embodiments disclosed herein below disclose methods of manufacturing re-entrant turning features using composite methods. Composite methods of manufacturing utilize two or more discrete pieces of material to form re-entrant turning features therebetween. These methods can allow for increased efficiency and flexibility in illumination system design. The turning features disclosed herein can be utilized in various devices and systems in which light turning, extraction, or redirection, is desired. In some embodiments, the turning features are utilized as light turning features in illumination devices. Such illumination devices can include wide area lights for indoor or outdoor use or different architectural lighting systems. For example, illumination devices can provide overhead lighting for rooms and other indoor spaces. In other embodiments, the turning features are utilized as light turning features in light guides configured to provide light in a display device, for example, a reflective display device.

Figure 3A:
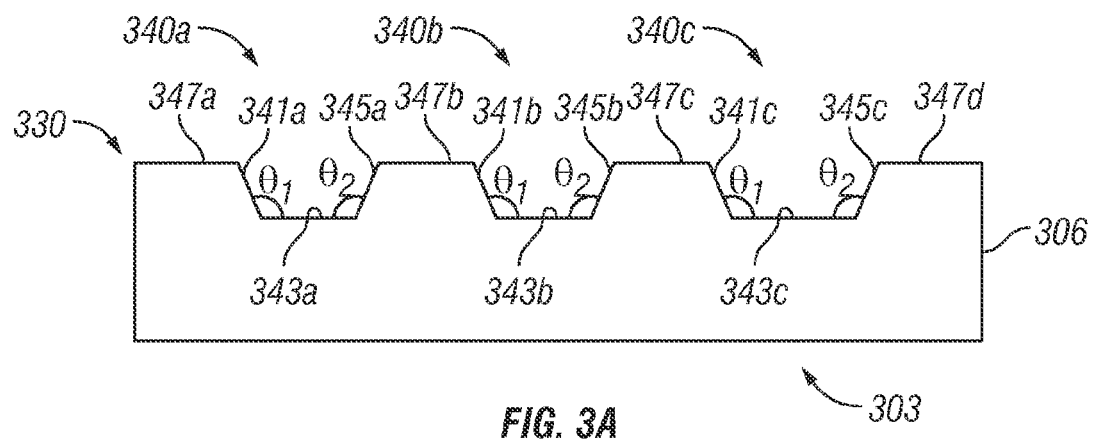
FIG. 3A is a cross-section of a base layer used to manufacture a first embodiment of an illumination system having a plurality of re-entrant turning features.

FIG. 3A schematically illustrates an embodiment of a base layer 306 that can be used in a composite method of manufacturing an illumination system having re-entrant turning features. The base layer 306 includes a plurality of receiving spaces 340a-c disposed in an upper surface 220 and extending toward a lower surface 303. The receiving spaces 340a-c can be sized and shaped to receive at least a portion of a cover lay to form re-entrant turning features therebetween. The receiving spaces 340a-c can comprise various shapes and sizes. In some embodiments, the receiving spaces 340a-c can be similarly sized and shaped. In other embodiments, at least one receiving space 340 can be differently sized and/or shaped than at least one other receiving space 340. For example, a first receiving space 340 can comprise a trapezoidal shaped groove and a second receiving space 340 can comprise a triangular shaped groove.

In the embodiment illustrated in FIG. 3A, receiving spaces 340a-c each define similarly sized trapezoidal shaped grooves having first sidewalls 341a-c, second sidewalls 345a-c, and base walls 343a-c extending therebetween. The first sidewalls 341a-c can form an angle $\theta_1$ with the base walls 345a-c and the second sidewalls can form an angle $\theta_2$ with the base walls to define a trapezoidal shaped depression in the base layer 306. In some embodiments, angle $\theta_1$ can be the same as angle $\theta_2$. In other embodiments, angles $\theta_1$ and $\theta_2$ can be different. In some embodiments, angles $\theta_1$ and $\theta_2$ can both be greater than about 75°, for example, greater than or equal to about 90°. The receiving spaces 340a-c can be disposed adjacent to one another with generally planar portions 347a-d separating the receiving spaces. The generally planar portions 347a-d can be disposed on a common plane that extends generally parallel to the lower surface 303 and/or the upper surface 330 of the base layer 306. The base walls 343a-c can be disposed generally parallel to one another and/or to one or more of the generally planar portions 347a-d. In some embodiments, the receiving spaces 340a-c can be similarly sized and shaped such that each base wall 343a-c is separated from the base surface 303 by substantially the same distance.

Figure 3B:
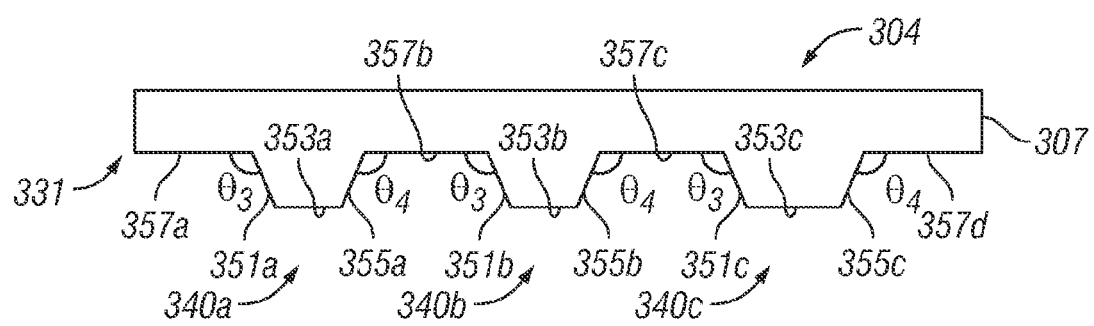
FIG. 3B is a cross-section of a cover layer used to manufacture the first embodiment of an illumination system.

FIG. 3B schematically illustrates an embodiment of a cover layer 307 that is configured to be coupled to (or mated with) the base layer 306 of FIG. 3A to form a light panel having re-entrant turning features. The cover layer 307 includes an upper surface 304, a lower surface 331, and a plurality of protrusions 350a-c that extend from lower surface 331 away from the upper surface 304. The protrusions 350a-c are sized and shaped such that at least a portion of the protrusions can be received within the receiving spaces 340a-c of FIG. 3A to form re-entrant turning features therebetween.

The protrusions 350a-c can comprise various shapes that are complimentary to the receiving spaces 340a-c of FIG. 3A, for example, such that the protrusions 350a-c fit into the receiving spaces 340a-c to form the re-entrant turning features therebetween. In one embodiment, the protrusions 350a-c comprise trapezoidal extensions, prism, or shapes having first sidewalls 351a-c, second sidewalls 355a-c, and base walls 353a-c extending therebetween. The protrusions 350a-c can be separated from one another by generally planar portions 357a-d of the lower surface 331. The generally planar portions 357a-d can be co-planar with one another or disposed on different planes. In some embodiments, the protrusions 350a-c extend from the lower surface 331 such that the base walls 353a-c are generally parallel to the generally planar portions 357a-d. The protrusions can be similarly or differently shaped. For example, the first sidewalls 351a-c can form an angle $\theta_3$ with the base walls 355a-c and the second sidewalls 353a-c can form an angle $\theta_4$ with the base walls with the base walls. In some embodiments, angle $\theta_3$ can be the same as angle $\theta_3$. In other embodiments, angles $\theta_3$ and $\theta_4$ can be different. Additionally, angles $\theta_1$ and $\theta_2$ can be the same or different as angles $\theta_3$ and $\theta_4$.

Figure 3C:
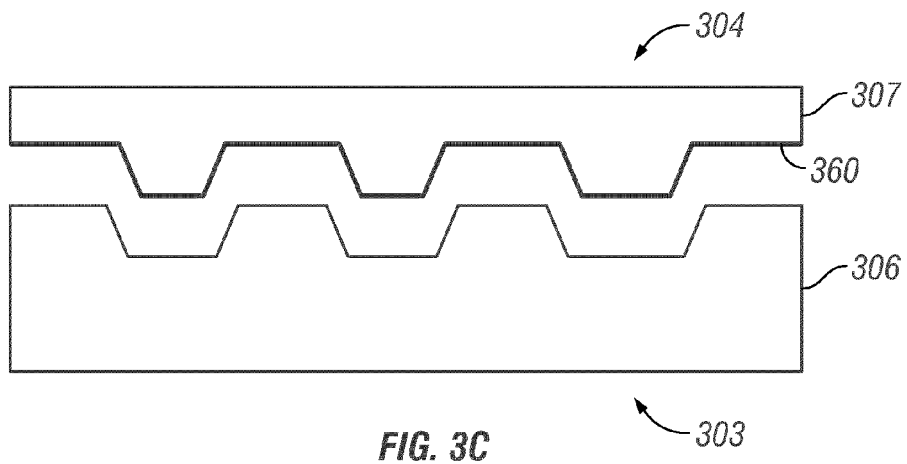
FIG. 3C is a cross-section of the base layer of FIG. 3A shown with the cover layer of FIG. 3B with a coupling layer applied to the cover layer.

As shown in FIG. 3C, a coupling layer 360 can be disposed on at least a portion of the cover layer 307 to couple the lower surface 331 of the cover layer 307 to the upper surface 330 of the base layer 306. In some embodiments, the coupling layer 360 can be disposed on one or more portions of the generally planar portions 357a-d of the cover layer 307 to couple the cover layer 307 to the generally planar portions 347a-d of the base layer 306. In other embodiments, the coupling layer 360 can be disposed on at least a portion of the upper surface 330 of the base layer 306 to couple the base layer to the cover layer 307. The coupling layer 360 can comprise various materials, for example, adhesives and/or bonding agents.

The base layer 306 of FIG. 3A and the cover layer 307 of FIG. 3B can comprise various optically transmissive materials, for example, glass, polymer, polycarbonate, polyethylene terephthalate, glycol-modified polyethylene terephthalate, amorphous thermoplastic, and/or other substrates. In some embodiments, the base layer 306 comprises a material with a higher refractive index than the cover layer 307 to promote TIR within the base layer 306. In such embodiments, the coupling layer 360 can comprise a material with an index of refraction that is substantially matched with the index of refraction of the cover layer 307 to promote TIR within the base layer 306 and to allow for re-entry of light from the cover layer into the base layer through the coupling layer 360.

Figure 3D:
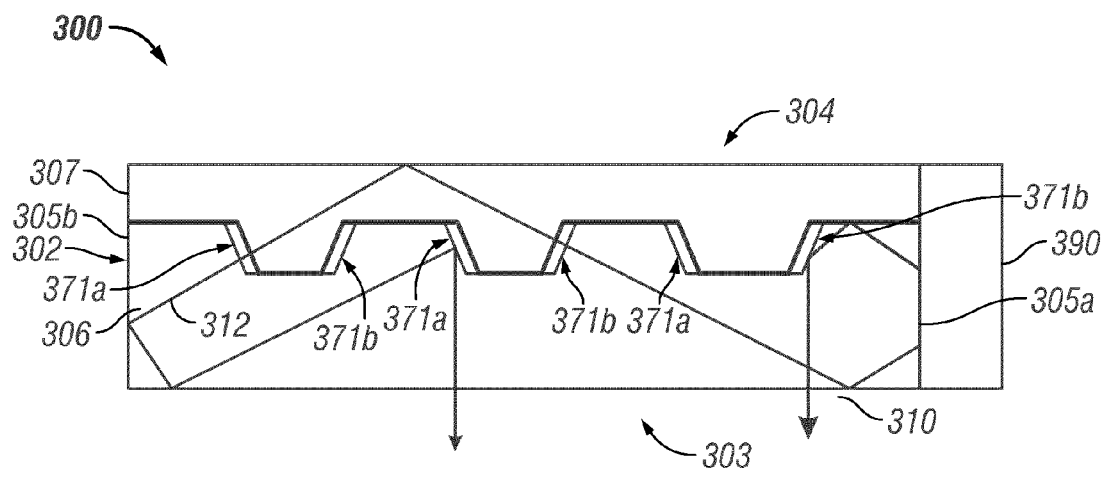
FIG. 3D is a cross-section of the first embodiment of an illumination system having a plurality of re-entrant turning features formed between the cover layer of FIG. 3B and the base layer of FIG. 3A.

Turning now to FIG. 3D, an embodiment of an illumination system 300 is schematically illustrated. The illumination system 300 includes a light source 390 disposed adjacent to a light panel 301. The light panel 301 comprises base layer 306 and cover layer 307 that have been coupled or mated together. Re-entrant turning features 371a, 371b are disposed between the receiving spaces 340a-c of the base layer 306 and the protrusions 350a-c of the cover layer 306. A first set 371a of the turning features is formed between the first sidewalls 351a-c of the protrusions 350a-c and the first sidewalls 341a-c of the receiving spaces 340a-c. The first set 371a comprises slits, gaps, spaces, or volumes that extend within the light panel 301 at an angle relative to the upper surface 304 and lower surface 303. A second set 371b of the turning features is formed between the second sidewalls 355a-c of the protrusions 350a-c and the second sidewalls 345a-c of the receiving spaces 340a-c. The second set 371b also comprises slits, spaces, or volumes that extend within the light panel 301 at an angle relative to the upper surface 304.

The second set 371b of turning features can be configured to turn light propagating within the light panel 301 from the first edge 305a toward the second edge 305b and the first set 371a can be configured to turn light propagating within the light panel from the second edge 305b toward the first edge 305a. For example, a first ray of light 310 can be injected into the light panel 301 through the first edge 305a by the light source 390. The first ray of light 310 can propagate within the light panel 301 toward the second edge 305b and encounter a turning feature 371b at an angle of incidence greater than the critical angle such that the ray is turned toward the lower surface 303 of the panel 301 by TIR. A second ray of light 312 can be injected into the light panel 301 through the first edge 305a and propagate generally toward the second edge 305b. Ray 312 can encounter turning feature 371b at an angle of incidence that is less than the critical angle for the boundary between the turning feature 371b and the base layer 306 such that the ray breaks TIR and propagates through the turning feature 371b. After propagating through turning feature 371b, ray 312 can be re-injected into the cover layer 307 portion of the light panel 301 and continue to propagate within the panel 301 by TIR. When propagating from the second edge 305b toward the first edge 305a, ray 312 can encounter a turning feature 371a at an angle of incidence that is greater than the critical angle such that the ray 312 is turned toward the lower surface 303. Thus, after propagating through the turning feature 371b, ray of light 312 can be recycled and extracted or turned toward a desired direction to increase the overall brightness and efficiency of the system 300.

Figure 3E:
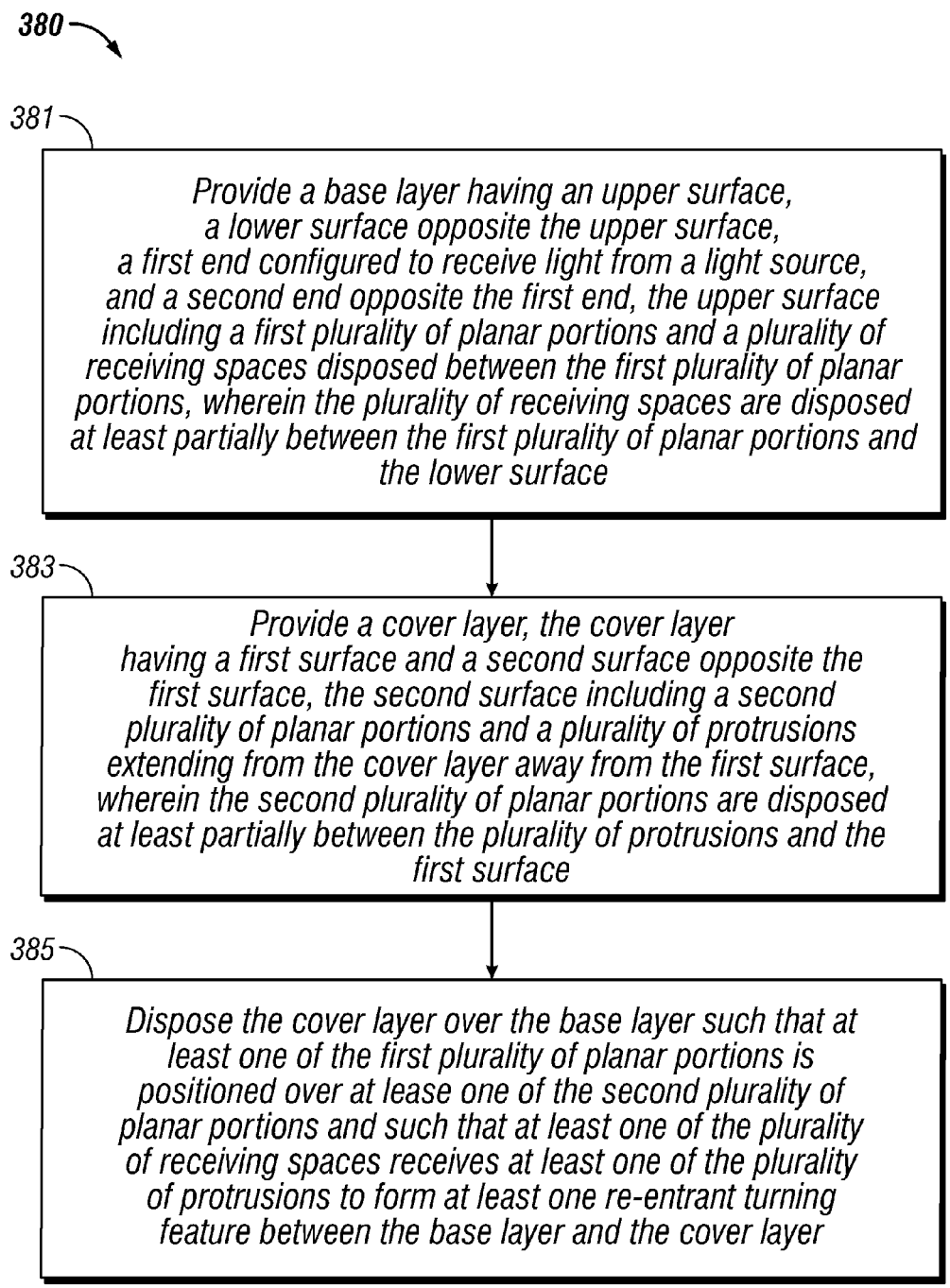
FIG. 3E is a block diagram schematically illustrating an embodiment of a method of manufacturing the light panel schematically illustrated in FIG. 3D.

FIG. 3E is a block diagram schematically illustrating an embodiment of a method 380 of manufacturing the illumination system of FIG. 3D. As illustrated in block 381, method 380 includes providing a base layer, the base layer having an upper surface and a lower surface opposite the upper surface, the upper surface including a first plurality of planar portions and a plurality of receiving spaces disposed between the first plurality of planar portions, wherein the plurality of receiving spaces are disposed at least partially between the first plurality of planar portions and the lower surface. The base layer can have a first end configured to receive light from a light source, and a second end opposite the first end. In one embodiment, the base layer provided can be similar to base layer 306 schematically illustrated in FIG. 3A. Method 380 further includes providing a cover layer as illustrated in block 383. The cover layer can have a first surface and a second surface opposite the first surface. In some embodiments, the second surface includes a second plurality of planar portions and a plurality of protrusions extending from the cover layer away from the first surface, wherein the second plurality of planar portions are disposed at least partially between the plurality of protrusions and the first surface. In one embodiment, the cover layer provided is similar to cover layer 307 schematically illustrated in FIG. 3B.

As illustrated in block 385, method 380 also includes disposed the cover layer over the base layer such that at least one of the first plurality of planar portions is positioned over at least one of the second plurality of planar portions and such that at least one of the plurality of receiving spaces receives at least one of the plurality of protrusions to form at least one re-entrant turning feature between the base layer and the cover layer. In this, way method 380 can be used to manufacture an illumination system with re-entrant turning features similar to illumination 300 schematically illustrated in FIG. 3D.

Figure 4A:
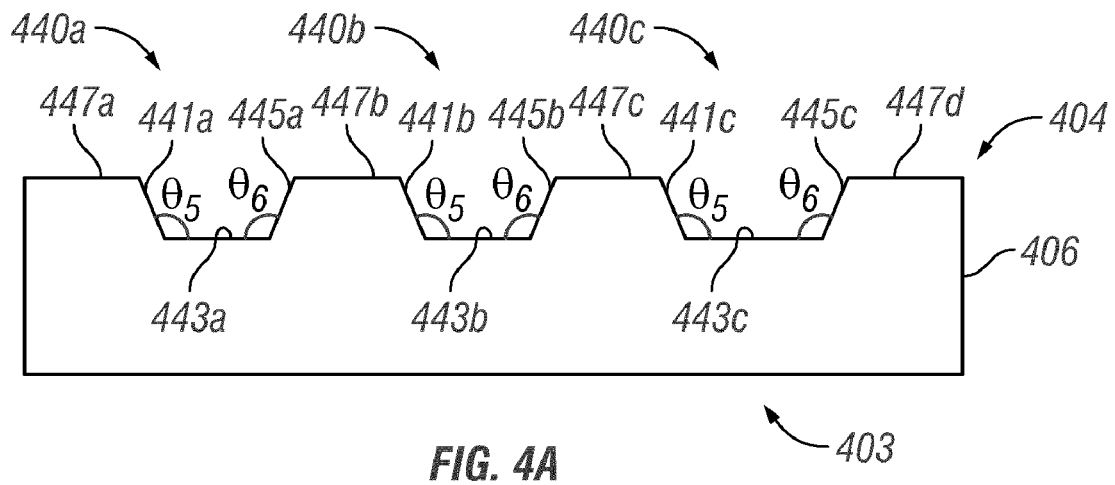
FIG. 4A is a cross-section of a base layer used to manufacture a second embodiment of an illumination system having a plurality of re-entrant turning features.

Turning now to FIG. 4A an embodiment of a base layer 406 that can be used in a composite method of manufacturing an illumination system having re-entrant turning features is schematically illustrated. The base layer 406 can be similar to or different than the base layer 306 illustrated in FIG. 3A. In one embodiment, base layer 406 comprises receiving spaces 440*a-c* disposed in an upper surface 404 of the base layer 406 and extending toward a lower surface 403. The receiving spaces 440*a-c* can be sized and shaped to receive at least a portion of a prismatic block to form re-entrant turning features therebetween.

Receiving spaces 440*a-c* can comprise various shapes. In one embodiment, receiving spaces 440*a-c* each define similarly sized trapezoidal shaped grooves or troughs having first sidewalls 441*a*, second sidewalls 445*a-c*, and base walls 443*a-c* extending therebetween. The first sidewalls 441*a-c* can form an angle $\theta_5$ with the base walls 445*a-c* and the second sidewalls can form an angle $\theta_6$ with the base walls to define a trapezoidal shaped depression in the base layer 406. In some embodiments, angle $\theta_5$ can be the same as angle $\theta_6$. In other embodiments, angles $\theta_5$ and $\theta_6$ can be different. In some embodiments, angles $\theta_5$ and $\theta_6$ can both be greater than about 75°, for example, greater than or equal to about 90°. The receiving spaces 440*a-c* can be disposed adjacent to one another with generally planar portions 447*a-d* separating the receiving spaces. The generally planar portions 447*a-d* can be disposed on a common plane that extends generally parallel to the lower surface 403 and/or the upper surface 404 of the base layer 406. The base walls 443*a-c* can be disposed generally parallel to one another and/or to one or more of the generally planar portions 447*a-d*. In some embodiments, the receiving spaces 440*a-c* can be similarly sized and shaped such that each base wall 443*a-c* is separated from the base surface 403 by substantially the same distance.

Figure 4B:
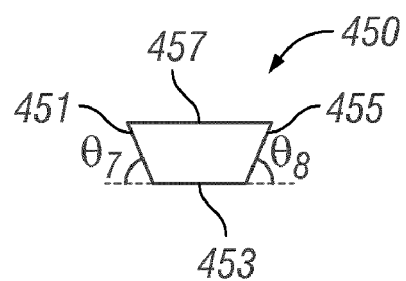
FIG. 4B is a cross-section of a prismatic block used to manufacture the second embodiment of an illumination system.

FIG. 4B schematically illustrates an embodiment of a prismatic block 450 that can be coupled to or mated with the base layer 406 of FIG. 4A to form a light panel having re-entrant turning features. The prismatic block 450 can be sized and shaped to compliment one or more of the receiving spaces 440*a-c* of the base layer 406 to form re-entrant features therebetween. In one embodiment, prismatic block 450 comprises a trapezoidal prism having a top surface 457, a bottom surface 453 that extends parallel to the top surface, a first sidewall 451 extending between the top surface and the bottom surface, and a second sidewall 455 disposed opposite to the first sidewall and extending between the top surface and the bottom surface. The first sidewall 451 can form an angle $\theta_7$ with the plane of the bottom surface 453 and the second sidewall 455 can form an angle $\theta_8$ with the plane of the bottom surface. In some embodiments, angle $\theta_7$ can be the same as angle $\theta_8$. In other embodiments, angles $\theta_7$ and $\theta_8$ can be different. Additionally, angles $\theta_5$ and $\theta_6$ in FIG. 4A can be the same or different as angles $\theta_7$ and $\theta_8$.

Figure 4C:
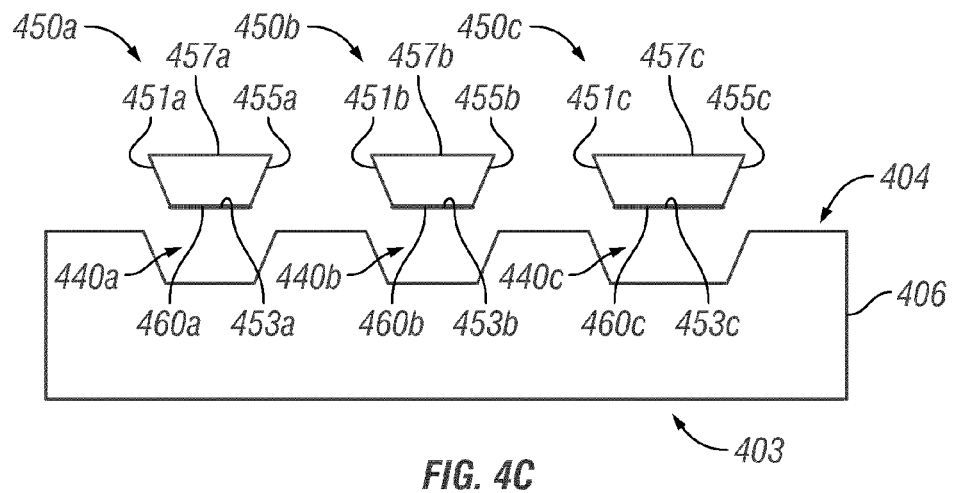
FIG. 4C is a cross-section of a set of prismatic blocks from FIG. 4B shown with the base layer of FIG. 4A and a coupling layer applied to each of the plurality of prismatic blocks.

As shown in FIG. 4C, a set of prismatic blocks 450*a-c* can be provided as part of a method of manufacturing an illumination system that includes the prismatic blocks 450*a-c* and base layer 406. Coupling layers 460*a-c* can be disposed over at least a portion of the prismatic blocks 450*a-c* to couple the prismatic blocks to the receiving spaces 440*a-b* of the base layer 406. In one embodiment, coupling layers 460*a-c* are disposed over portions of the bottom surfaces 453*a-c* to couple the bottom surfaces to the base layer 406. In other embodiments, the coupling layers 460*a-c* can be disposed over portions of the base layer 406 to couple the base layer to the prismatic blocks 450*a-c*. The coupling layers 460*a-c* can comprise various materials, for example, adhesives and/or bonding agents. In some embodiments, the coupling layers 460*a-c* comprise materials with an index of refraction characteristic that substantially matches an index of refraction characteristic of the base layer 406 such that a ray of light propagating from base layer 406 through a coupling layer 460 into a prismatic block 450 is not reflected or refracted by the medium boundaries of the path.

Figure 4D:
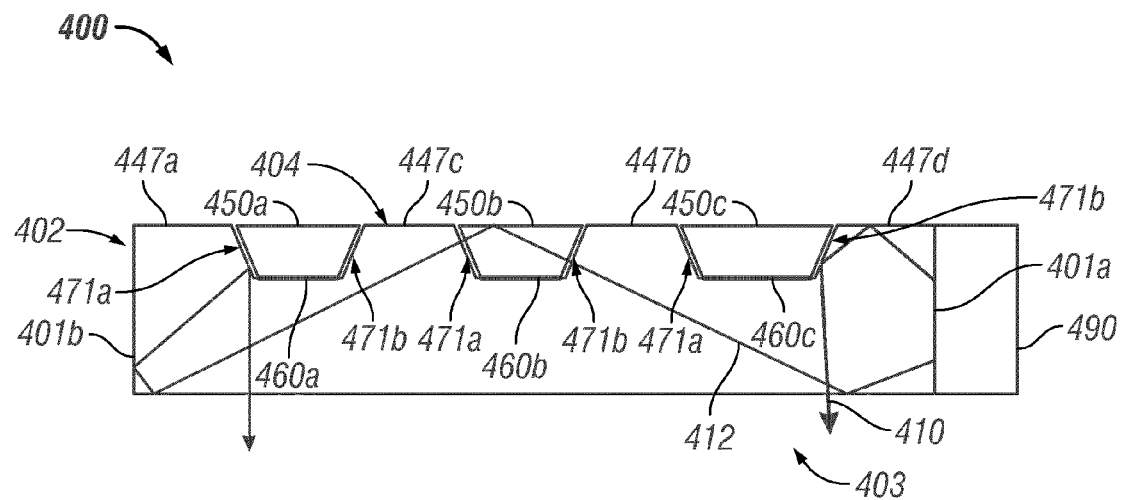
FIG. 4D is a cross-section of the second embodiment of an illumination system having a plurality of re-entrant turning features formed between the prismatic blocks of FIG. 4B and the base layer of FIG. 4A.

Turning now to FIG. 4D, an embodiment of an illumination system 400 is schematically illustrated. The illumination system 400 includes a light source 490 disposed adjacent to a light panel 401. The light panel 401 includes base layer 406 with prismatic blocks 450*a-c* received within the receiving spaces 440*a-c*. This configuration results in turning features 471*a*, 471*b* disposed between the receiving spaces of the base layer 406 and the prismatic blocks 450*a-c*. A first set 471*a* of the turning features is formed between the first sidewalls 441*a-c* of the receiving spaces 440*a-c* and the first sidewalls 451*a-c* of the prismatic blocks 450*a-c*. The first set 471*a* comprises slits, gaps, spaces, or volumes that extend within the light panel 401 at an angle relative to the upper surface 404 and lower surface 403. A second set 471*b* of the turning features is formed between the second sidewalls 455*a-c* of the prismatic blocks 450*a-c* and the second sidewalls 445*a-c* of the receiving spaces 440*a-c*. The second set 471*b* also comprises slits, spaces, or volumes that extend within the light panel 401 at an angle relative to the upper surface 404.

The second set 471*b* of turning features can be configured to turn light propagating within the light panel 401 from the first edge 405*a* toward the second edge 405*b* and the first set 471*a* can be configured to turn light propagating within the light panel from the second edge 405*b* toward the first edge 405*a*. In one embodiment, a first ray of light 410 can be injected into the light panel 401 through the first edge 405*a* by the light source 490. The first ray of light 410 can propagate within the light panel 401 toward the second edge 405*b* and encounter a turning feature 471*b* at an angle of incidence greater than the critical angle such that the ray is turned toward the lower surface 403 of the panel 401 by TIR. A second ray of light 412 can be injected into the light panel 401 through the first edge 405*a* and propagate generally toward the second edge 405*b*. Ray 412 can encounter turning feature 471*b* at an angle of incidence that is less than the critical angle for the boundary between the turning feature 471*b* and the base layer 406 such that the ray breaks TIR and propagates through the turning feature 471*b*. Because of the orientation and configuration of the re-entrant turning feature 471*b*, ray 412 can pass through the turning feature and be re-injected into the prismatic block 450*b* portion of the panel 401 such that ray 412 continues to propagate within the panel 401 until being turned by a turning feature 471*a*, 471*b*. Thus, after propagating through the turning feature 471*b*, ray of light 412 can be recycled and extracted or turned toward a desired direction to increase the overall brightness and efficiency of the system 400.

Figure 4E:
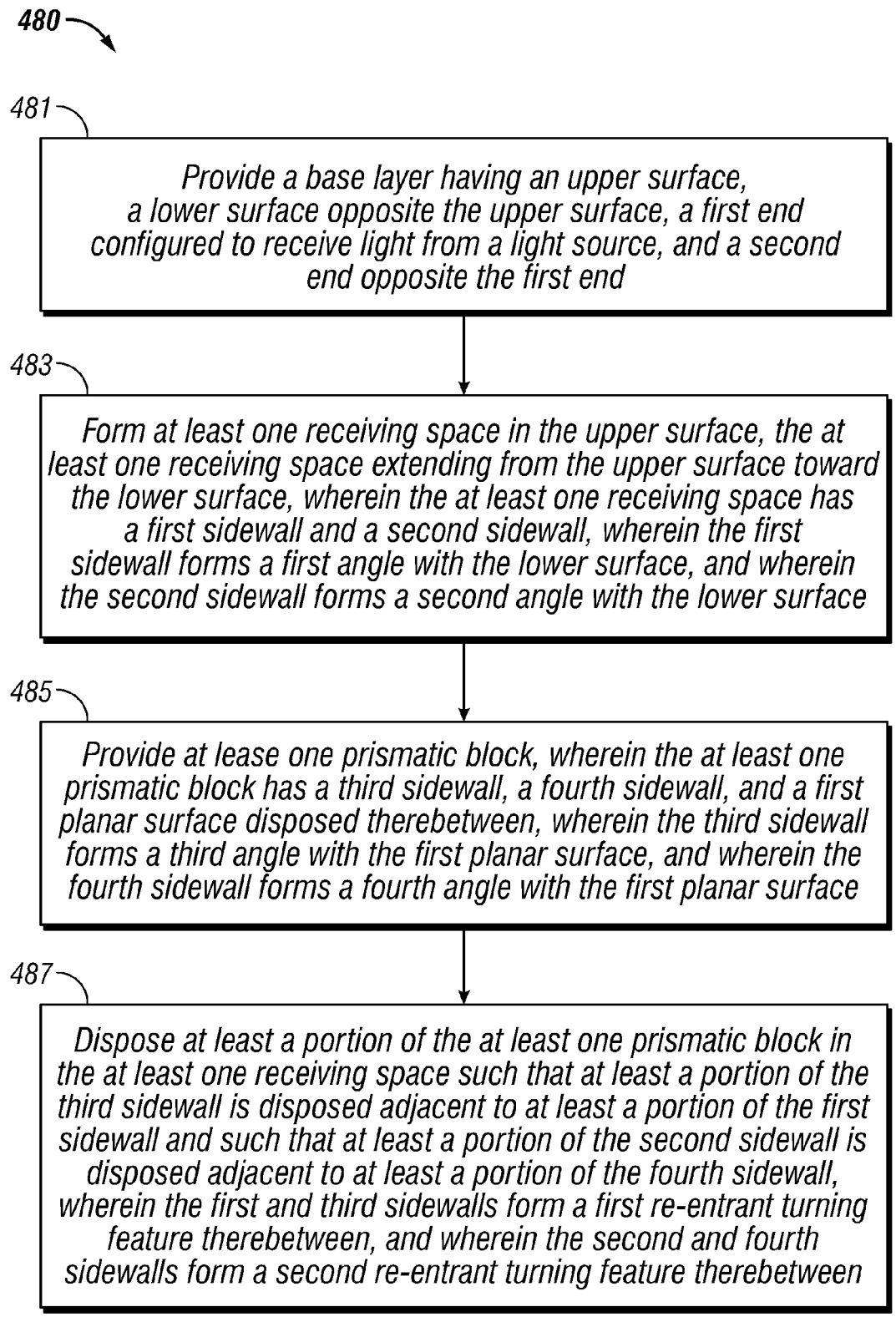
FIG. 4E is a block diagram schematically illustrating an embodiment of a method of manufacturing the light panel schematically illustrated in FIG. 4D.

FIG. 4E is a block diagram schematically illustrating an embodiment of a method 480 of manufacturing the illumination system of FIG. 4D. As illustrated in block 481, method 480 includes providing a base layer having an upper surface, a lower surface opposite the upper surface, a first end configured to receive light from a light source, and a second end opposite the first end. Method 480 further includes forming at least one receiving space in the upper surface as illustrated in block 483. The receiving space can extend from the upper surface toward the lower surface and the receiving space can have a first sidewall and a second sidewall. In some embodiments, the first sidewall forms a first angle with the lower surface and the second sidewall forms a second angle with the lower surface resulting in a base layer similar to base layer 406 in FIG. 4A.

As illustrated in block 485, method 480 can include providing at least one prismatic block, wherein the at least one prismatic block has a third sidewall, a fourth sidewall, and a first planar surface disposed therebetween. Similar to prismatic block 450 of FIG. 4B, the third sidewall can form a third angle with the first planar surface and the fourth sidewall can form a fourth angle with the first planar surface. Method 480 also includes disposing at least a portion of the at least one prismatic block in the at least one receiving space such that at least a portion of the third sidewall is disposed adjacent to at least a portion of the first sidewall and such that at least a portion of the second sidewall is disposed adjacent to at least a portion of the fourth sidewall as illustrated in block 487. The first and third sidewalls can form a first re-entrant turning feature therebetween and the second and fourth sidewalls can form a second re-entrant turning feature therebetween resulting in a light panel similar to panel 401 schematically illustrated in FIG. 4D.

Figure 5A:
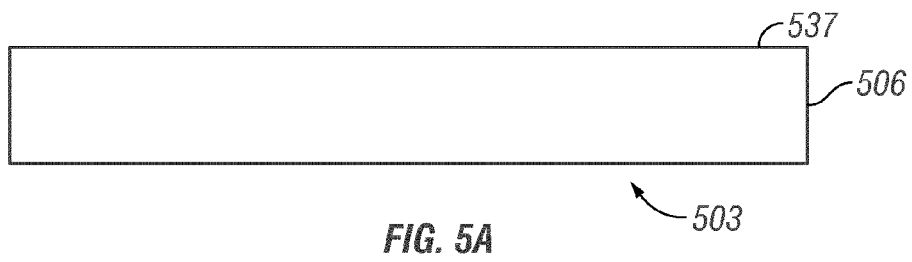
FIG. 5A is a cross-section of a base layer used to manufacture a third embodiment of an illumination system having a plurality of re-entrant turning features.

FIG. 5A schematically illustrates an embodiment of a base layer 506 that can be used in a composite method of manufacturing an illumination system having re-entrant turning features. Base layer 506 can comprise various shapes, for example, a rectangular prism. In one embodiment, base layer 506 includes a generally planar receiving surface 537 and a generally planar lower surface 503 disposed opposite to the receiving surface. The base layer 506 can comprise various optically transmissive materials, for example, glass, polymer, polycarbonate, polyethylene terephthalate, glycol-modified polyethylene terephthalate, amorphous thermoplastic, and/or other substrates.

Figure 5B:
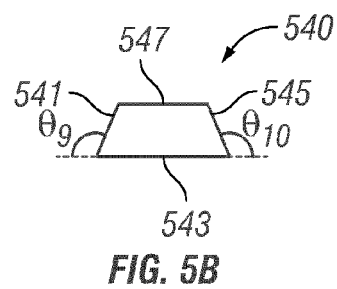
FIG. 5B is a cross-section of a first prismatic block used to manufacture the third embodiment of an illumination system.

FIG. 5B schematically illustrates an embodiment of a first prismatic block 540 that can be coupled to or mated with the base layer 506 to form a light panel having re-entrant turning features. The prismatic block 540 can comprise various shapes having various sizes, for example, trapezoidal prisms, triangular prisms, and other polygonal prisms. In one embodiment, prismatic block 540 comprises a trapezoidal prism having a top surface 547, a bottom surface 543 that extends parallel to the top surface, a first sidewall 541 extending between the top surface and the bottom surface, and a second sidewall 545 disposed opposite to the first sidewall and extending between the top surface and the bottom surface. The first sidewall 541 can form an angle $\theta_9$ with the plane of the bottom surface 543 and the second sidewall 545 can form an angle $\theta_{10}$ with the plane of the bottom surface. In some embodiments, angle $\theta_9$ can be the same as angle $\theta_{10}$. In other embodiments, angles $\theta_9$ and $\theta_{10}$ can be different. In some embodiments, angles $\theta_9$ and $\theta_{10}$ can both be greater than about 75°, for example, greater than or equal to about 90°.

Figure 5C:
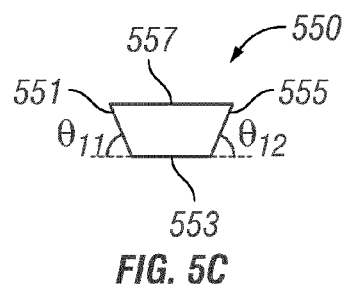
FIG. 5C is a cross-section of a second prismatic block used to manufacture the third embodiment of an illumination system.

FIG. 5C schematically illustrates an embodiment of a second prismatic block 550 that can be coupled to or mated with the base layer 506 to form a light panel having re-entrant turning features. The prismatic block 550 can comprise various shapes having various sizes, for example, trapezoidal prisms, triangular prisms, and other polygonal prisms. In some embodiments, the prismatic block 550 comprises a shape having a size that is complimentary to the first prismatic block 540 of FIG. 5B to form at least one re-entrant turning feature therebetween. In one embodiment, prismatic block 550 comprises a trapezoidal prism having a top surface 557, a bottom surface 553 that extends parallel to the top surface, a first sidewall 551 extending between the top surface and the bottom surface, and a second sidewall 555 disposed opposite to the first sidewall and extending between the top surface and the bottom surface. The first sidewall 551 can form an angle $\theta_{11}$ with the plane of the bottom surface 553 and the second sidewall 555 can form an angle $\theta_{12}$ with the plane of the bottom surface. In some embodiments, angle $\theta_{11}$ can be the same as angle $\theta_{12}$. In other embodiments, angles $\theta_{11}$ and $\theta_{11}$ can be different. Additionally, angles $\theta_9$ and $\theta_{10}$ in FIG. 5B can be the same or different as angles $\theta_{11}$ and $\theta_{12}$.

Figure 5D:
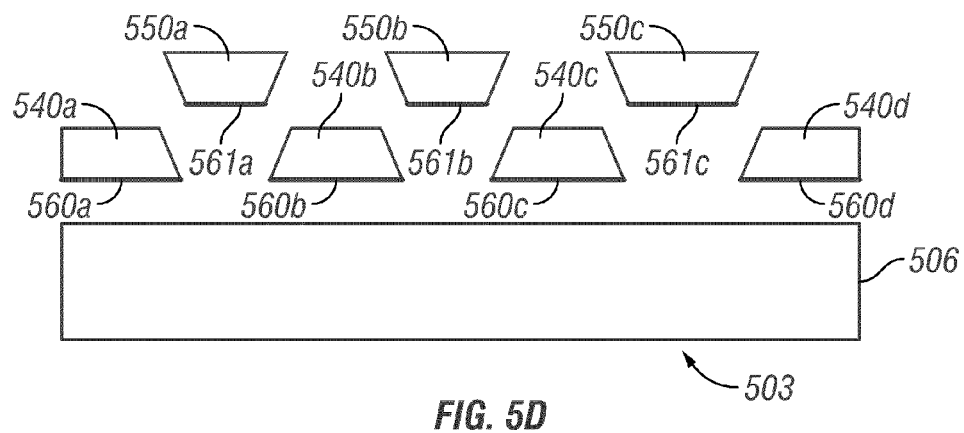
FIG. 5D is a cross-section of a set of the first prismatic blocks from FIG. 5B and the second prismatic blocks from FIG. 5C shown with the base layer of FIG. 5A and a coupling layer applied to each of the prismatic blocks.

As shown in FIG. 5D, a set of first prismatic blocks 540a-d and a set of second prismatic blocks 550a-c can be provided as part of a method of manufacturing an illumination system that includes the first prismatic blocks 540a-d, second prismatic blocks 550a-c, and base layer 506. Coupling layers 560a-d can be disposed over at least a portion of first prismatic blocks 540a-d to couple the first prismatic blocks to the base layer 506. When coupled to the base layer 506, the set of first prismatic blocks 540a-d can form receiving spaces therebetween for receiving the second prismatic blocks 550a-c. Coupling layers 561a-c can be disposed over at least a portion of second prismatic blocks 550a-d to couple the second prismatic blocks to the base layer 506 in the receiving spaces formed by the first prismatic blocks 540a-d. One or more coupling layers (not shown) can also be disposed over the base layer 506 to couple the base layer to the first prismatic blocks 540a-d and the second prismatic blocks 550a-c. The coupling layers 560a-d, 561a-c can comprise various materials, for example, adhesives and/or bonding agents. In some embodiments, the coupling layers 560a-d, 561a-c comprise materials with an index of refraction characteristic that substantially matches the index of refraction characteristics of the base layer 506, first prismatic blocks 540a-d, and second prismatic blocks 550a-c such that a ray of light propagating from base layer 506 through a coupling layers 560a-d, 561a-c into a prismatic block 540, 550 is not reflected or refracted by the medium boundaries of the path.

Figure 5E:
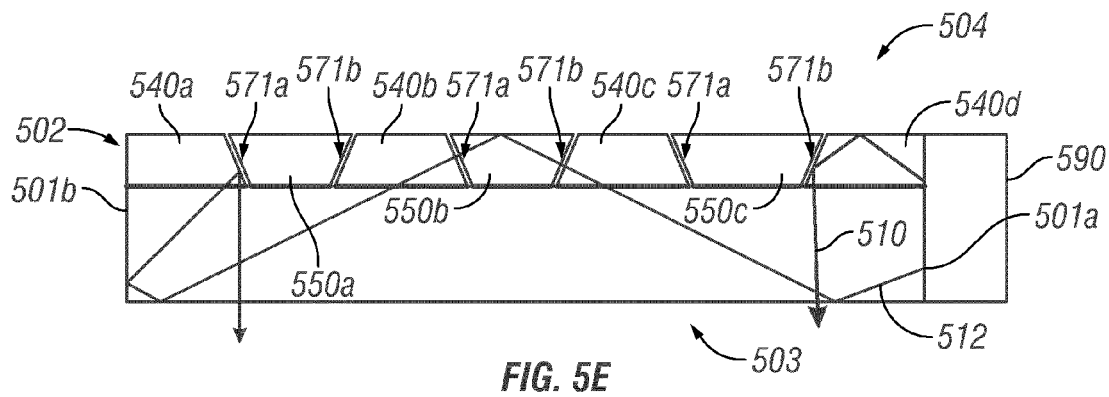
FIG. 5E is a cross-section of the third embodiment of an illumination system having a plurality of re-entrant turning features formed between the prismatic blocks of FIGS. 5B and 5C and the base layer of FIG. 5A.

Turning now to FIG. 5E, an embodiment of an illumination system 500 is schematically illustrated. The illumination system 500 includes a light source 590 disposed adjacent to a light panel 501. The light panel 501 includes base layer 506 and the set of first prismatic blocks 540a-d and the set of second prismatic blocks 550a-c. This configuration results in turning features 571a, 571b disposed between the set of first prismatic blocks 540a-d and the set of second prismatic blocks 550a-c. A first set 571a of the turning features is formed between the second sidewalls 545a-d of the first prismatic blocks 540a-d and the first sidewalls 551a-c of the second prismatic blocks 550a-c. The first set 571a comprises slits, gaps, spaces, or volumes that extend within the light panel 501 at an angle relative to the upper surface 504 and lower surface 503. A second set 571b of the turning features is formed between the first sidewalls 541a-d of the first prismatic blocks 540a-d and the second sidewalls 555a-c of the second prismatic blocks 550a-c. The second set 571b of re-entrant turning features also comprises slits, spaces, or volumes that extend within the light panel 501 at an angle relative to the upper surface 504.

The second set 571b of turning features can be configured to turn light propagating within the light panel 501 from the first edge 505a toward the second edge 505b and the first set 571a can be configured to turn light propagating within the light panel from the second edge 505b toward the first edge 505a. In one embodiment, a first ray of light 510 can be injected into the light panel 501 through the first edge 505a by the light source 590. The first ray of light 510 can propagate within the light panel 501 toward the second edge 505b and encounter a turning feature 571b at an angle of incidence greater than the critical angle such that the ray is turned toward the lower surface 503 of the panel 501 by TIR. A second ray of light 512 can be injected into the light panel 501 through the first edge 505a and propagate generally toward the second edge 505b. Ray 512 can encounter turning feature 571b at an angle of incidence that is less than the critical angle for the boundary between the turning feature 571b and the base layer 506 such that the ray breaks TIR and propagates through the turning feature 571b. Because of the orientation and configuration of the re-entrant turning feature 571b, ray 512 can pass through the turning feature and be re-injected into the prismatic block 540a-d, 550a-c portion of the panel 501 such that ray 512 continues to propagate within the panel 501 until being turned by a re-entrant turning feature 571a, 571b. Thus, after propagating through the turning feature 571b, ray of light 512 can be recycled and extracted or turned toward a desired direction to increase the overall brightness and efficiency of the system 500.

Figure 5F:
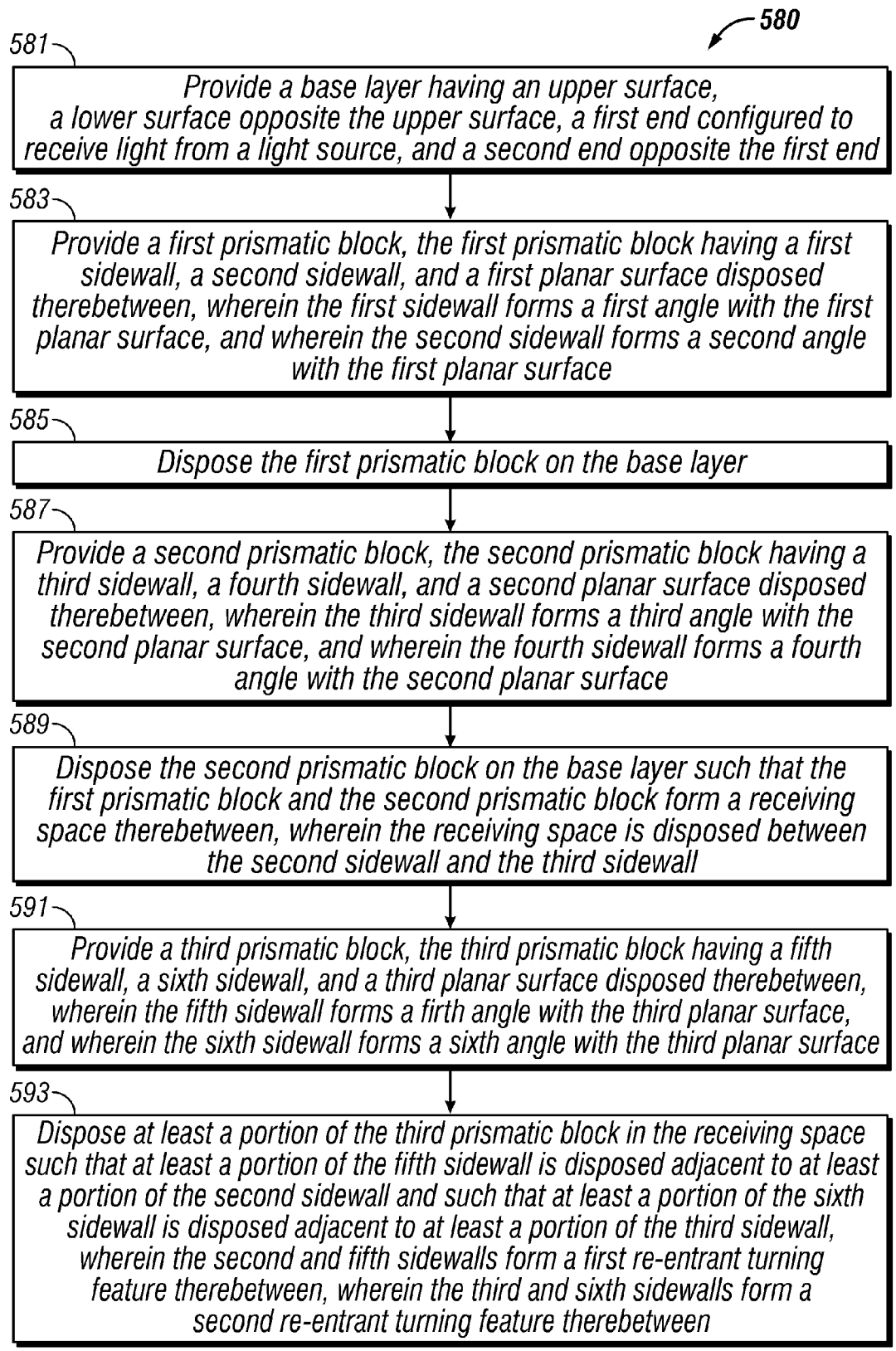
FIG. 5F is a block diagram schematically illustrating an embodiment of a method of manufacturing the light panel schematically illustrated in FIG. 5E.

FIG. 5F is a block diagram schematically illustrating an embodiment of a method 580 for manufacturing the illumination system of FIG. 5E. As illustrated in block 581, method 580 includes providing a base layer. In some embodiments, the base layer can be similar to base layer 506 of FIG. 5A and have an upper surface, a lower surface opposite the upper surface, a first end configured to receive light from a light source, and a second end opposite the first end. Method 580 further includes providing a first prismatic block as illustrated in block 583. The first prismatic block can have a first sidewall, a second sidewall, and a first planar surface disposed therebetween. The first sidewall can form a first angle with the first planar surface and the second sidewall can form a second angle with the first planar surface. In some embodiments, the first prismatic block can be similarly sized and/or shaped to the prismatic block 540 of FIG. 5B. As shown in block 585, method 580 can include disposing the first prismatic block on the base layer. In some embodiments, the first prismatic block can be disposed on a portion of the upper surface of the base layer.

Method 580 can include providing a second prismatic block as illustrated in block 587. The second prismatic block can have a third sidewall, a fourth sidewall, and s second planar surface disposed therebetween. The third sidewall can form a third angle with the second planar surface and the fourth sidewall can form a fourth angle with the second planar surface. In some embodiments, the second prismatic block can be similarly sized and/or shaped to the prismatic block 540 of FIG. 5B. As shown in block 589, method 580 can include disposing the second prismatic block on the base layer such that the first prismatic block and the second prismatic block form a receiving space between the second sidewall and the third sidewall.

Method 580 can include providing a third prismatic block as illustrated in block 591. The third prismatic block can have a fifth sidewall, a sixth sidewall, and a third planar surface disposed therebetween. The fifth sidewall can form a fifth angle with the third planar surface and the sixth sidewall can form a sixth angle with the second planar surface. In some embodiments, the third prismatic block can be similarly sized and/or shaped to the prismatic block 550 of FIG. 5C. As shown in block 593, method 580 can include disposing at least a portion of the third prismatic block in the receiving space formed between the first prismatic block and the second prismatic block such that at least a portion of the fifth sidewall is disposed adjacent to at least a portion of the second sidewall and such that at least a portion of the sixth sidewall is disposed adjacent to at least a portion of the third sidewall. This can result in a first re-entrant turning feature formed between the second and fifth sidewalls and a second re-entrant turning feature formed between the third and sixth sidewalls.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A method of manufacturing a light panel, the method comprising:

providing a base layer having an upper surface, a lower surface opposite the upper surface, a first end configured to receive light from a light source, and a second end opposite the first end, the upper surface including a first plurality of planar portions and a plurality of receiving spaces disposed between the first plurality of planar portions, the plurality of receiving spaces disposed at least partially between the first plurality of planar portions and the lower surface, at least one of the receiving spaces including a trapezoidal trough having first and second sidewalls, the first sidewall disposed at a first angle relative to the lower surface, and the second sidewall disposed at a second angle relative to the lower surface;

providing a cover layer having a first surface and a second surface opposite the first surface, the second surface including a second plurality of planar portions and a plurality of protrusions extending from the cover layer away from the first surface, and the second plurality of planar portions disposed at least partially between the plurality of protrusions and the first surface; and coupling the cover layer to the base layer such that at least one of the first plurality of planar portions is positioned over at least one of the second plurality of planar portions and such that the at least one of the receiving spaces receives at least one of the plurality of protrusions to form a re-entrant turning feature between the base layer and the cover layer.

2. The method of claim 1, wherein each of the first plurality of planar portions share a common plane.

3. The method of claim 2, wherein the re-entrant turning feature extends between the lower surface of the base layer and the first surface of the cover layer at an angle relative to the plane shared by the first plurality of planar portions.

4. The method of claim 3, wherein coupling the cover layer to the base layer forms a first re-entrant turning feature and a second re-entrant turning feature between the base layer and the cover layer, wherein the first re-entrant turning feature extends between the lower surface of the base layer and the first surface of the cover layer at a first angle relative to the plane shared by the first plurality of planar portions, wherein the second re-entrant turning feature extends between the lower surface of the base layer and the first surface of the cover layer at a second angle relative to the plane shared by the first plurality of planar portions, and wherein the first angle is different from the second angle.

5. The method of claim 1, wherein each of the second plurality of planar portions share a common plane.

6. The method of claim 1, wherein the base layer has an index of refraction characteristic, wherein the cover layer has an index of refraction characteristic, and wherein the index of refraction characteristic of the base layer is greater than the index of refraction characteristic of the cover layer.

7. The method of claim 6, wherein an adhesive is used to couple the base layer to the cover layer, and wherein the adhesive has an index of refraction characteristic that is closer to the index of refraction characteristic of the cover layer than the index of refraction characteristic of the base layer.

8. The method of claim 7, wherein the upper surface of the base layer is bonded to the second surface of the cover layer.

9. The method of claim 7, wherein the index of refraction characteristic of the adhesive is about the same as the index of refraction characteristic of the cover layer.

10. The method of claim 1, wherein the at least one of the plurality of protrusions comprises a trapezoidal prism having third and fourth sidewalls.

11. The method of claim 10, wherein the third sidewall is disposed between the second sidewall and the first end at a third angle relative to the lower surface.

12. The method of claim 11, wherein the first angle is different from the third angle.

13. The method of claim 10, wherein the fourth sidewall is disposed at a fourth angle relative to the lower surface.

14. The method of claim 13, wherein the second angle is different from the fourth angle.

15. The method of claim 10, wherein the third sidewall is disposed adjacent to at least a portion of the first sidewall, and wherein the fourth sidewall is disposed adjacent to at least a portion of the second sidewall.

16. The method of claim 15, wherein the first sidewall and the third sidewall define the re-entrant turning feature therebetween.

17. The method of claim 16, wherein the re-entrant turning feature includes a slit.

18. The method of claim 15, wherein the second sidewall and the fourth sidewall define the re-entrant turning feature therebetween.

19. The method of claim 18, wherein the re-entrant turning feature includes a slit.

* * * * *